(12) United States Patent
Takizawa et al.

(10) Patent No.: US 12,213,082 B2
(45) Date of Patent: Jan. 28, 2025

(54) TRANSMISSION POWER CONTROL METHOD, TERMINAL, AND WIRELESS COMMUNICATION SYSTEM

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP); Fumihide Kojima, Koganei (JP); Atsushi Kurosawa, Fuchu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 473 days.

(21) Appl. No.: 17/713,503

(22) Filed: Apr. 5, 2022

(65) Prior Publication Data

US 2022/0330170 A1    Oct. 13, 2022

(30) Foreign Application Priority Data

Apr. 8, 2021   (JP) .................................. 2021-066142

(51) Int. Cl.
*H04W 52/24*    (2009.01)
*H04W 52/36*    (2009.01)
*H04W 52/50*    (2009.01)

(52) U.S. Cl.
CPC ....... *H04W 52/245* (2013.01); *H04W 52/367* (2013.01); *H04W 52/50* (2013.01)

(58) Field of Classification Search
CPC ... H04W 52/18; H04W 52/24; H04W 52/245; H04W 52/36; H04W 52/367; H04W 52/38; H04W 52/50
See application file for complete search history.

(56) References Cited

U.S. PATENT DOCUMENTS 10,912,039 B2 *  2/2021  Chen ................... H04W 52/245
11,019,571 B2 *  5/2021  Wernersson .......... H04W 52/42
(Continued)

OTHER PUBLICATIONS

Moriyama et al., "A Radio Resource Allocation Technique Considering Communication Delay for UL-NOMA Systems Employing Successive Interference Cancellation", The Institute of Electronics, Information and Communication Engineers, IEICE Technical Report SR2018, Mar. 2019 vol. 118, No. 475, pp. 23-30.
(Continued)

*Primary Examiner* — Quochien B Vuong
(74) *Attorney, Agent, or Firm* — Finnegan, Henderson, Farabow, Garrett and Dunner, LLP

(57)    ABSTRACT

There is provided a transmission power control method for a terminal. In this method, when reception power is divided into at least two ranks at equal intervals, each of the at least two ranks has an allowable range having an identical size, a margin is set between a lower limit of the allowable range in an upper rank and an upper limit of the allowable range in a lower rank in the at least two ranks, and the allowable range is equal to or larger than the margin, the terminal adjusts transmission power of the first signal and the second signal by using a transmission power adjustment amount calculated by using reception power of the first signal and the second signal, a reception power difference between these signals, the at least two ranks, the allowable range, and the margin.

20 Claims, 22 Drawing Sheets

(56) References Cited

U.S. PATENT DOCUMENTS

2021/0144037 A1* 5/2021 Yamamoto .............. H04W 4/70
2022/0239540 A1* 7/2022 Finkelstein ....... H04L 12/40195

OTHER PUBLICATIONS

Moriyama et al., "Experimental Evaluation of a Novel Up-Link NOMA System for IoT Communication Equipping Repetition Transmission and Receive Diversity" IEICE Trans. Commun. Aug. 2019 vol. E102-B, No. 8, pp. 1467-1476.

* cited by examiner

CONNECTED TERMINAL NUMBER INFORMATION

| RECEPTION RANK | DB1 NUMBER OF CONNECTED TERMINALS | DB2 NUMBER OF CONNECTED TERMINALS |
|---|---|---|
| $a_1$ | $A_1$ | $B_1$ |
| ... | ... | ... |
| $a_{M-1}$ | $A_{M-1}$ | $B_{M-1}$ |
| $a_M$ | $A_M$ | $B_M$ |
| $a_{M+1}$ | $A_{M+1}$ | $B_{M+1}$ |
| $a_{M+2}$ | $A_{M+2}$ | $B_{M+2}$ |
| $a_{M+3}$ | $A_{M+3}$ | $B_{M+3}$ |
| ... | ... | ... |
| $a_N$ | $A_N$ | $B_N$ |

FIG. 15

CONNECTED TERMINAL NUMBER INFORMATION

| RECEPTION RANK | DB1 NUMBER OF CONNECTED TERMINALS | DB2 NUMBER OF CONNECTED TERMINALS |
|---|---|---|
| $a_1$ | | |
| ... | ... | ... |
| $a_{M-1}$ | | |
| $a_M$ | 500 | |
| $a_{M+1}$ | 300 | |
| $a_{M+2}$ | 200 | 500 |
| $a_{M+3}$ | 150 | 200 |
| $a_{M+3}$ | 50 | 100 |
| $a_N$ | | 50 |

⇐ RECEPTION RANK OF 10A IN DB1

⇐ RECEPTION RANK OF 10A IN DB2

⬇ LOWER RECEPTION RANK BY REDUCING TRANSMISSION POWER

SUM OF NUMBERS OF CONNECTED TERMINALS (TERMINAL 10A) RANK ORDER

| RANK ORDER | SUM $Y_d$ OF NUMBERS OF CONNECTED TERMINALS IN DB1 AND DB2 |
|---|---|
| 1 (RANK REMAINS SAME) | 500+500 = 1000 |
| 2 (CASE WHERE RANK IS LOWERED BY 1) | 300+200 = 500 |
| 3 (CASE WHERE RANK IS LOWERED BY 2) | 200+100 = 300 |
| 4 (CASE WHERE RANK IS LOWERED BY 3) | 150+50 = 200 |
| 5 (CASE WHERE RANK IS LOWERED BY 4) | 50+50 = 100 |

FIG. 16

| RANK ORDER $d$ | SUM $Y_d$ OF NUMBERS OF CONNECTED TERMINALS IN DB1 AND DB2 | DIFFERENCE FROM AVERAGE VALUE $\Delta Y_d = Y_d - Y_{ave}$ | POSSIBILITY $P_o$ TO SHIFT $(Y_d - Y_{ave})/Y_d$ | POSSIBILITY $P_I$ TO BE SHIFTED $-\Delta Y_d / Z_{sum}$ |
|---|---|---|---|---|
| 1 | 500+500 = 1000 | 580 | =580/1000 | 0 |
| 2 | 300+200 = 500 | 80 | | 0 |
| 3 | 200+100 = 300 | −120 | | 120/660 |
| 4 | 150+50 = 200 | −220 | | 220/660 |
| 5 | 50+50 = 100 | −320 | | 320/660 |

AVERAGE VALUE
$Y_{ave} = 420$

CALCULATE SUM OF ABSOLUTE VALUES OF NEGATIVE VALUES OBTAINED AS DIFFERENCE FROM AVERAGE $\Delta Y$  $Z_{sum} = 660$

FIG. 17

CONNECTED TERMINAL NUMBER INFORMATION

| RECEPTION RANK | DB1 NUMBER OF CONNECTED TERMINALS | DB2 NUMBER OF CONNECTED TERMINALS | |
|---|---|---|---|
| ⋮ | ⋮ | ⋮ | |
| $a_{M-1}$ | $A_{M-1}$ | $B_{M-1}$ | |
| $a_M$ | $(A_M)$ | $B_M$ | ⬅ RECEPTION RANK OF 10A IN DB1 |
| $a_{M+1}$ | $A_{M+1}$ | $B_{M+1}$ | |
| $a_{M+2}$ | $A_{M+2}$ | $(B_{M+2})$ | ⬅ RECEPTION RANK OF 10A IN DB2 |
| $a_{M+3}$ | $A_{M+3}$ | $B_{M+3}$ | |
| ⋮ | ⋮ | ⋮ | |
| $a_N$ | $A_N$ | $B_N$ | |

⬇ $D$: LOWEST RECEPTION RANK
$s$: DIFFERENCE IN RANK

| RANK ORDER | SUM $Y_d$ OF NUMBERS OF CONNECTED TERMINALS IN DB1 AND DB2 $Y_d$ |
|---|---|
| 1 | $Y_1 = A_M + B_{M+s}$ |
| 2 | $Y_2 = A_{M+1} + B_{M+s+1}$ |
| ⋮ | ⋮ |
| $D=N-M-s+1$ | $Y_D = A_{N-s} + B_N$ |

FIG. 21

SIMULATION PARAMETERS

| PARAMETERS | VALUES |
|---|---|
| NUMBER OF BASE STATIONS | 2 |
| NUMBER OF ANTENNAS OF DISTRIBUTED BASE STATION | DISTRIBUTED BASE STATION 1 $N_1 = 1$, DISTRIBUTED BASE STATION 2 $N_2 = 1$ |
| NUMBER OF TERMINALS $M$ | 100 TO 400 (RANDOMLY DISPOSED PER CALCULATION) |
| TRANSMISSION FREQUENCY $J$ OF EACH TERMINAL | ONCE PER SECOND |
| NUMBER OF TRANSMISSION SLOTS PER SECOND | 2000 |
| NUMBER RECEPTION RANKS (POWER DIFFERENCE $X$) | 5 (3dB) |
| NUMBER OF TERMINAL ANTENNAS | 1 |
| CELL RADIUS $L$ | 2000 m |
| POSITIONAL DISPLACEMENT $d$ OF EACH BASE STATION FROM CENTER OF CELL | 500 m (DISPOSED ON A STRAIGHT LINE PASSING THROUGH CENTER) |
| LONG INTERVAL VARIATION | $D^{-\alpha}$ RULE, $D$ IS DISTANCE BETWEEN TERMINAL AND BASE STATION (WITH ASSUMPTION THAT $\alpha = 3.5$) |
| SHORT INTERVAL VARIATION | LOG-NORMAL DISTRIBUTION (WITH ASSUMPTION THAT STANDARD DEVIATION IS 8) |
| INSTANTANEOUS VALUE VARIATION (MAXIMUM DOPPLER FREQUENCY $fd$) | SINGLE PATH RAYLEIGH FADING ($fd$=0Hz) |
| BASE STATION ANTENNA GAIN | 12dBi (NONDIRECTIONAL) |
| TERMINAL ANTENNA GAIN | 2dBi (NONDIRECTIONAL) |
| MAXIMUM TERMINAL OUTPUT | 23 dBm |

TRANSMISSION POWER CONTROL METHOD, TERMINAL, AND WIRELESS COMMUNICATION SYSTEM

CROSS-REFERENCE TO RELATED APPLICATION

This application claims the benefit of Japanese Patent Application No. 2021-066142, filed on Apr. 8, 2021, which is hereby incorporated by reference herein in its entirety.

BACKGROUND

1. Field

The present invention relates to a transmission power control method, a terminal, and a wireless communication system.

2. Description of the Related Art

With an increase in the number of terminals used in the Internet of Things (IoT), there is a concern about uplink congestion. To increase the number of terminals connectable in uplink, application of power-domain uplink non-orthogonal multiple access (PD-UL-NOMA) for uplink in a power domain is anticipated. In addition, in an environment in which a communication environment is greatly changed, for example, in mobile communication or the like, a distributed base station configuration, in which a plurality of base stations are arranged in a cell, has been studied to improve the quality of uplink communication.

Non Patent Literature 1: Moriyama et al., "A Radio Resource Allocation Technique Considering Communication Delay for UL-NOMA Systems Employing Successive Interference Cancellation" The Institute of Electronics, Information and Communication Engineers, IEICE Technical Report SR2018, Vol. 118, No. 475, pp. 23-30, March 2019.

Non Patent Literature 2: M. Moriyama et al., "Experimental Evaluation of a Novel Up-Link NOMA System for IoT Communication Equipping Repetition Transmission and Receive Diversity," IEICE TRANS. COMMUN., Vol. E102-B, No. 8, August 2019.

SUMMARY

In NOMA, a signal, in which a plurality of signals having different reception power is multiplexed, is received, and each of the signals is separated from the multiplexed signal and decoded. To properly separate the signals, a sufficient difference in reception power needs to be provided between the signals.

In a distributed base station configuration using PD-UL-NOMA, it is assumed that a plurality of terminals existing in a cell respectively transmit signals to two distributed base stations. At present, a method for controlling transmission power of terminals in a cell in the distributed base station configuration using PD-UL-NOMA has not been proposed. Therefore, for example, when there are two distributed base stations, it is conceivable that transmission power is adjusted so that a reception power difference between terminals becomes appropriate in one base station. However, even if the reception power difference between the terminals is appropriately set in one distributed base station, the reception power difference between the terminals in the other distributed base station may become insufficient. Thus, failing to ensure the sufficient reception power difference in the other base station may result in preventing appropriate separation and decoding of the signals.

It is an object of the present disclosure to provide a transmission power control method, a terminal, and a wireless communication system capable of ensuring, when terminals transmit signals to two respective base stations, an appropriate reception power difference between the terminals in each base station.

According to one aspect of the present disclosure, there is provided a transmission control method for a terminal capable of transmitting a first signal received by a first base station and a second signal received by a second base station by power-domain non-orthogonal multiple access, the transmission power control method including: causing the terminal to calculate, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin; and causing the terminal to adjust transmission power of the first signal and the second signal in the terminal by using the transmission power adjustment amount.

According to another aspect of the present disclosure, there is provided a terminal capable of transmitting a first signal received by a first base station and a second signal received by a second base station by power-domain non-orthogonal multiple access, the terminal including: a controller that calculates, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin, and adjusts transmission power of the first signal and the second signal in the terminal by using the transmission power adjustment amount.

According to yet another aspect of the present disclosure, there is provided a wireless communication system including: a first base station; a second base station; and a terminal capable of transmitting a first signal received by the first base station and a second signal received by the second base station by power-domain non-orthogonal multiple access, wherein the terminal includes a controller that calculates, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin, and adjusts transmission power of the first signal and the second signal in the terminal by using the transmission power adjustment amount.

According to the present disclosure, when terminals transmit signals to two respective base stations, an appropriate reception power difference between the terminals can be ensured in each base station.

BRIEF DESCRIPTION OF THE DRAWINGS

FIG. 14A illustrates an example of information about the number of connected terminals and FIG. 14B illustrates an example of collisions in reception ranks;

FIG. 15 is an explanatory diagram illustrating a method for reducing the possibility of collision between terminals in distributed base stations according to the embodiment and illustrates information about the number of connected terminals and the sum of the numbers of terminals connected to the two distributed base stations;

FIG. 16 is an explanatory diagram illustrating a method for reducing the possibility of collision between terminals in distributed base stations according to the embodiment and illustrates a table indicating an average value of the sum of the numbers of terminals, a difference from the average value, etc.;

FIG. 17 is an explanatory diagram illustrating a method for reducing the possibility of collision between terminals in distributed base stations according to the embodiment;

FIG. 21 is an explanatory diagram of the simulation as the example; and

DESCRIPTION OF THE PREFERRED EMBODIMENTS

Figure 1:
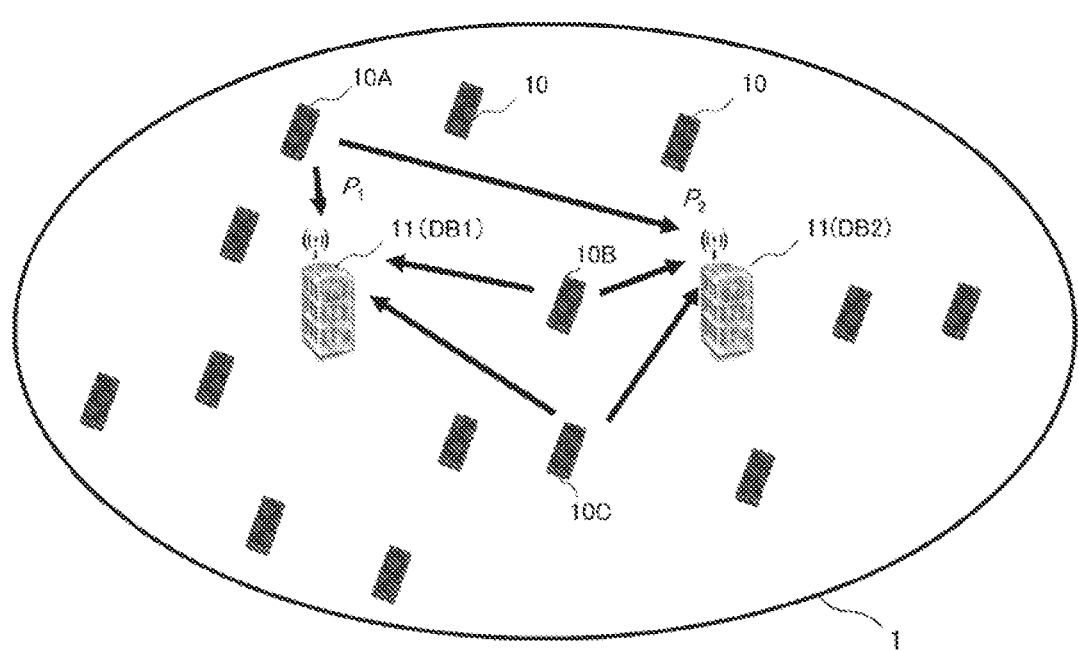
FIG. 1 illustrates an example of a configuration of a wireless communication system according to an embodiment.

In an embodiment, a transmission power control method for a terminal capable of transmitting a first signal received by a first base station and a second signal received by a second base station by power-domain non-orthogonal multiple access (PD-NOMA) will be described. In this transmission power control method, reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and a size of the allowable variation range is equal to or larger than a size of the margin. The terminal calculates a power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin. Next, the terminal adjusts transmission power of the first signal and the second signal in the terminal by using the transmission power adjustment amount.

According to the transmission power control method, transmission power adjustment is performed on the first and second signals so that the reception power of the first signal and the reception power of the second signal fall within the allowable variation range of any of the at least two ranks. Such an operation is performed by each terminal connected to the first and second base stations so that each of the first and second base stations can receive a multiplexed signal from each terminal in a state in which an appropriate reception power difference is ensured. That is, when terminals transmit signals to two respective base stations, it is possible to ensure an appropriate reception power difference between the terminals in each base station.

In the transmission power control method according to the embodiment, a configuration which defines that a size of the allowable variation range and a size of the margin are identical and that an interval between the at least two ranks is set to a value obtained by doubling a total value of the size of the allowable variation range and the size of the margin may be adopted. The size of the allowable variation range may be equal to or larger than the size of margin. With such a configuration, an accurate power difference can be provided.

The transmission power control method according to the embodiment may adopt the following configuration. That is, when the reception power difference between the first signal and the second signal is smaller than the allowable variation range, the terminal specifies, from the at least two ranks, a rank closest to first reception power, which is reception power having a larger value between the reception power of the first signal and the reception power of the second signal. Next, the terminal calculates the transmission power adjustment amount such that the reception power of the first signal and the reception power of the second signal fall within the allowable variation range of the closest rank. In this way, a sufficient power difference can be ensured.

The transmission power control method according to the embodiment may adopt the following configuration. That is, when a remainder obtained by dividing the reception power difference between the first signal and the second signal by a value obtained by doubling a total value of the size of the allowable variation range and the size of the margin is smaller than the total value, the terminal specifies, from the at least two ranks, a rank closest to first reception power, which is reception power having a larger value between the reception power of the first signal and the reception power of the second signal. Further, the terminal calculates a value obtained by adding or subtracting a half of the remainder to or from a value obtained by subtracting the first reception power from reception power of the closest rank as a transmission power adjustment amount for the first reception power. Next, the terminal 10 calculates, from the transmission power adjustment amount for the first reception power and the reception power difference, a transmission power adjustment amount for second reception power, which is reception power having a smaller value between the reception power of the first signal and the reception power of the second signal. In this way, a sufficient power difference can be ensured.

The transmission power control method according to the embodiment may adopt the following configuration. That is, when the reception power difference between the first signal and the second signal is equal to or larger than the allowable variation range and equal to or smaller than a value obtained by doubling a total value of the size of the allowable variation range and the size of the margin, the terminal specifies, from the at least two ranks, a rank closest to first reception power, which is reception power having a larger value between the reception power of the first signal and the reception power of the second signal. Further, the terminal calculates a transmission power adjustment amount for the first reception power and second reception power such that the first reception power falls within the allowable variation range of the closest rank and the second reception power, which is the reception power having a smaller value between the reception power of the first signal and the reception power of the second signal, falls within the allowable variation range of a rank lower than the closest rank. In this way, a sufficient power difference can be ensured.

The transmission power control method according to the embodiment may adopt the following configuration. That is, when a remainder obtained by dividing the reception power difference between the first signal and the second signal by a value obtained by doubling a total value of the size of the allowable variation range and the size of the margin is larger than the total value, the terminal specifies, from the at least two ranks, a rank closest to first reception power, which is reception power having a larger value between the reception power of the first signal and the reception power of the second signal. Further, the terminal calculates a value obtained by adding or subtracting half a value obtained by subtracting the remainder from a value obtained by doubling the total value to or from a value obtained by subtracting the first reception power from reception power of the closest rank, as a transmission power adjustment amount for the first reception power. Next, the terminal calculates, from the transmission power adjustment amount for the first reception power and the reception power difference, a transmission power adjustment amount for second reception power, which is reception power having a smaller value between the reception power of the first signal and the reception power of the second signal. In this way, a sufficient power difference can be ensured.

The transmission power control method according to the embodiment may adopt the following configuration. That is, based on information indicating a sum of the number of terminals connected to the first base station and the number of terminals connected to the second base station for each of the at least two ranks, the terminal specifies a sum of first ranks, which is a sum of the numbers of connected terminals in ranks to which the reception power of the first signal and the reception power of the second signal belong. Further, when ranks to which the reception power of the first signal and the reception power of the second signal belong are lowered to a predetermined rank, which is lower by one rank or two or more ranks, the terminal calculates sums of second ranks, each of which is a sum of the number of terminals connected to the first base station and the number of terminals connected to the second base station, for respective lower ranks up to the predetermined rank. Further, when the sum of the first ranks exceeds an average value of the sum of the first ranks and the sums of the second ranks in the respective lower ranks, the terminal determines that the ranks to which the reception power of the first signal and the reception power of the second signal belong are shifted to a lower rank in which the sum of the second ranks is smaller than the average value, based on a first probability. Next, the terminal reduces transmission power of the first signal and the second signal in accordance with the shift to the lower rank. In this way, when the sum of the numbers of connected terminals that transmit signals in the same ranks as the ranks of the first signal and the second signal transmitted by the terminal is larger than the average value, the ranks are shifted to a lower rank in which the sum of the numbers of connected terminals is smaller than the average value, based on the first probability. As a result, it is possible to reduce the possibility (probability) that the first signal and the second signal collide with (cannot ensure a sufficient power difference from) a signal from another terminal (connected terminal).

The transmission power control method according to the embodiment may adopt the following configuration. That is, the terminal calculates the first probability by dividing a value obtained by subtracting the average value from the sum of the first ranks by the sum of the first ranks. In this way, the terminal can be shifted with a suitable probability, and the number of connected terminals can be reduced so as to reduce the possibility of collision.

The transmission power control method according to the embodiment may adopt the following configuration. That is, when there are at least two lower ranks in which the sum of the second ranks is smaller than the average value, the terminal calculates an absolute value of a value obtained by adding values obtained by subtracting the average value from the sum of the second ranks in each of the at least two lower ranks and calculates, for each of the at least two lower ranks, a value obtained by dividing the absolute value by a value obtained by subtracting the average value from the sum of the second ranks, as a probability that each of the at least two lower ranks is selected as a shift destination. In this way, it is possible to appropriately distribute shift destinations of terminals.

The embodiment of the present disclosure can include a terminal that performs a transmission power control operation by using the transmission power control method described above and a wireless communication system including such a terminal. In addition, the embodiment of the present disclosure can also include a program for performing the transmission power control method, the program being executed by an information processing apparatus such as a terminal, and a non-transitory computer-readable recording medium storing the program.

Hereinafter, the embodiment of the present disclosure will be described with reference to the drawings. A configuration of the following embodiment is an example, and the present disclosure is not limited to the configuration of the embodiment.

Radio Communication System

FIG. 1 illustrates an example of a configuration of a wireless communication system according to the embodiment. The wireless communication system includes a plurality of base stations 11 included in a cell 1 and a plurality of (one or two or more) terminals 10 communicably connected to each base station 11.

Each of the plurality of terminals 10 performs uplink communication using PD-UL-NOMA when transmitting data, such as IoT-related data obtained by a sensor, to a predetermined destination. For example, in FIG. 1, the plurality of base stations 11 operates as two distributed base stations DB1 and DB2, and for example, each of the terminals 10A, 10B, and 10C included in the plurality of terminals 10 transmits a radio signal as a first signal to the distributed base station DB1 and transmits a radio signal as a second signal to the distributed base station DB2. In the following description, when a terminal is not specified, the terminal is simply expressed as a "terminal 10".

Each of the distributed base stations DB1 and DB2 receives signals (first signals and second signals) transmitted in parallel from the terminals 10A, 10B, and 10C. Each of the distributed base stations DB1 and DB2 is connected to a control station, receives a multiplexed signal in which the signals transmitted from the terminals 10A, 10B, and 10C are multiplexed, and transmits the received multiplexed signal to the control station. The control station separates the respective signals from the terminals 10A, 10B, and 10C from the multiplexed signal by using successive interference cancellation (SIC) and decodes the separated signals, thereby obtaining the data from each of the terminals 10A, 10B, and 10C. The control station individually performs processing on the first signal and the second signal so that normal data can be obtained from either one of the first signal and the second signal.

Figure 2:
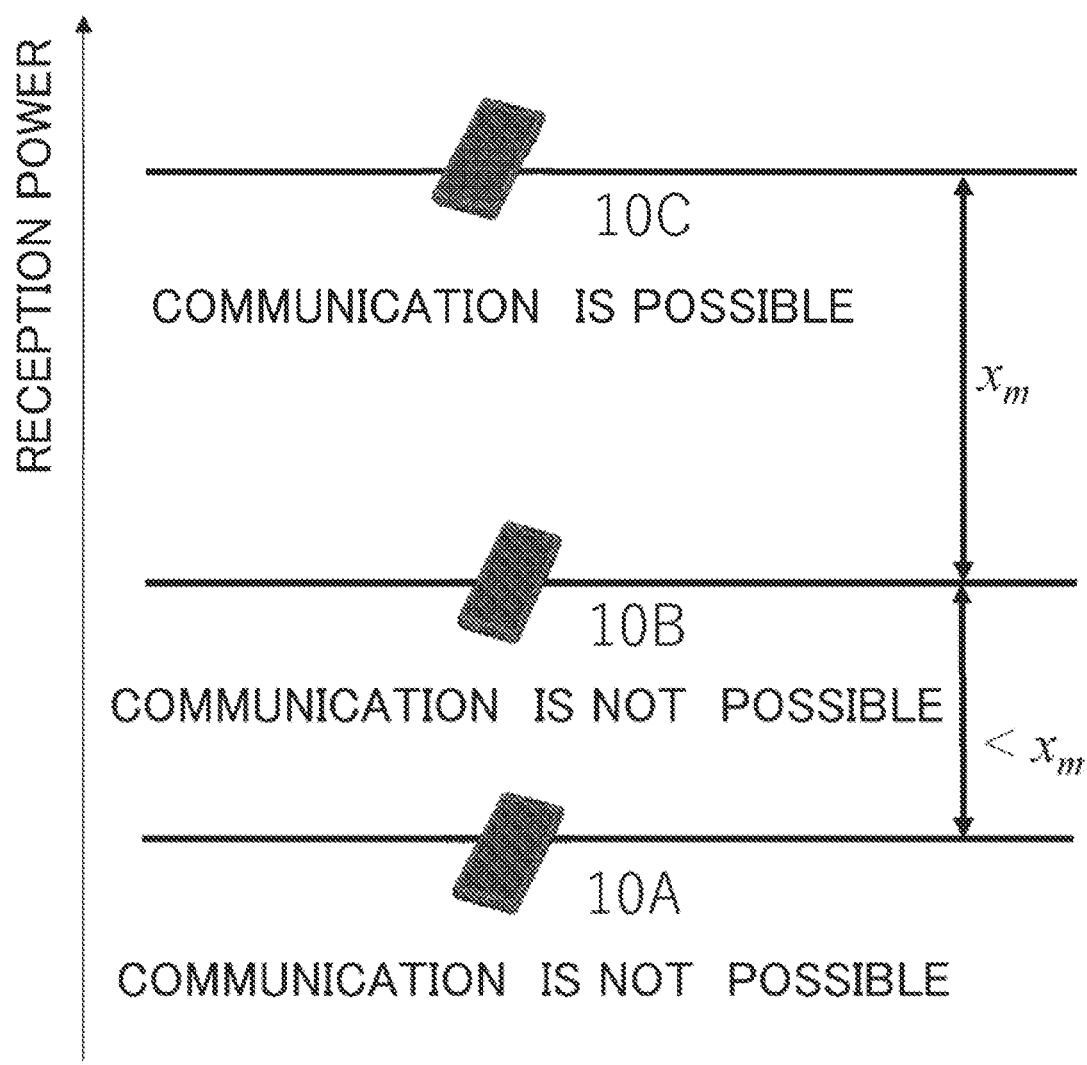
FIG. 2 is an explanatory diagram illustrating a relationship between reception power and whether communication is possible or not in a certain base station.

FIG. 2 illustrates reception power of signals from a plurality of terminals 10 received by a certain base station 11. As a condition for enabling communication in PD-UL-NOMA, there is a power difference (margin) xm needed between reception power of signals from the terminals 10. In PD-UL-NOMA, the base station 11 performs communication with the terminals 10 such that a power difference xm is generated between reception power of signals received from the respective terminals 10.

In the example illustrated in FIG. 2, for example, the power difference between the reception power of a signal from the terminal 10C and the reception power of a signal from the terminal 10B is equal to or greater than xm. In this case, since the signal can be properly separated and decoded by SIC, the terminal 10C can communicate with the base station 11.

In contrast, in the example illustrated in FIG. 2, the power difference between the reception power of a signal from the terminal 10B and the reception power of a signal from the terminal 10A is smaller than xm. In this case, since the signal cannot be properly separated and decoded due to interference between signals, the terminals 10B and 10A cannot communicate with the base station 11.

Examples of a factor that determines the size of the margin xm include a packet error rate (PER), a communication band, a modulation scheme, and an error correction scheme.

Figure 3:
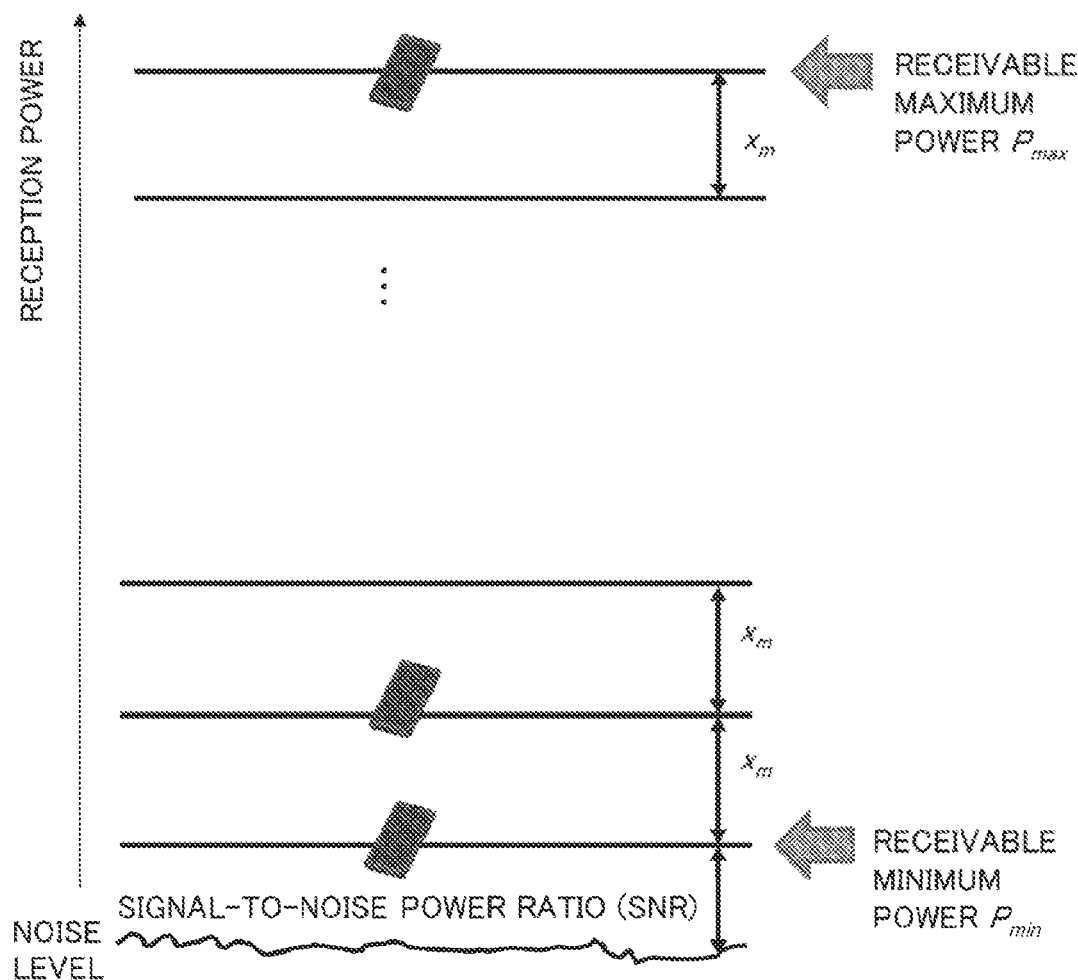
FIG. 3 is an explanatory diagram illustrating an example (comparative example) of transmission power control in a certain base station.

FIG. 3 is an explanatory diagram illustrating an example of transmission power control in a certain base station 11. As illustrated in FIG. 3, it is conceivable that each terminal 10 performs a transmission power control operation on a signal so that the reception power is divided in units of a margin xm. In this case, a receivable maximum power Pmax is determined by a limiting factor such as an input power limit of an amplifier or the number of quantization bits. In addition, a receivable minimum power Pmin is determined by a signal-to-noise power ratio (SNR) at which communication is possible, or the like.

Next, a case where the wireless communication system has a distributed base station configuration using PD-UL-NOMA will be considered. For example, in the example illustrated in FIG. 1, as described above, each of the terminals 10A, 10B, and 10C transmits signals in parallel to the respective distributed base stations DB1 and DB2. Each of the distributed base stations DB1 and DB2 receives a signal in which the signals from the terminals 10A, 10B, and 10C are multiplexed.

Figure 4A:
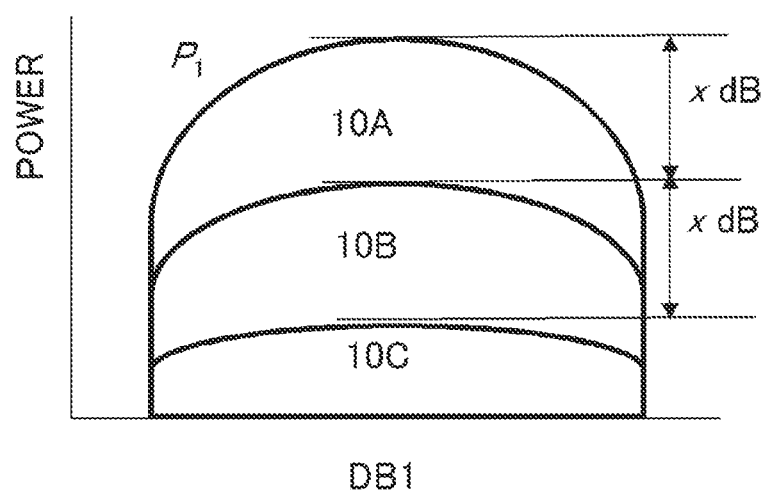
FIG. 4A illustrates signals from respective terminals in one distributed base station.
Figure 4B:
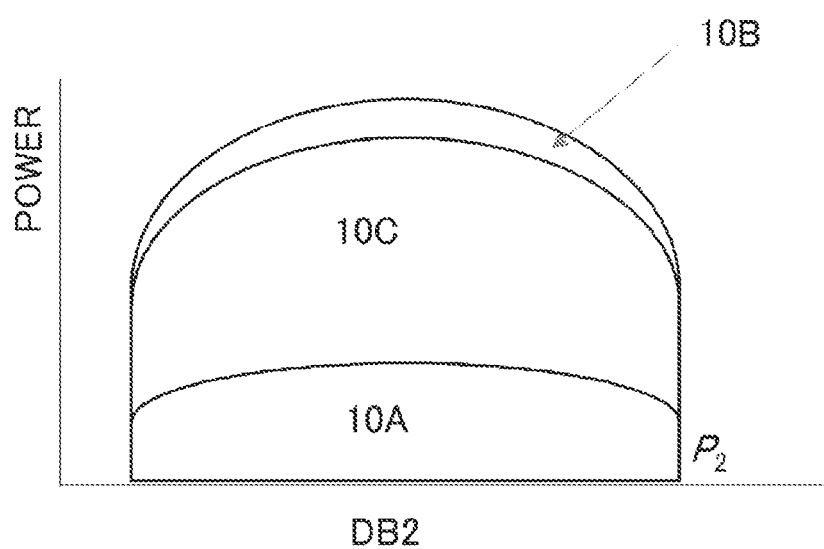
FIG. 4B illustrates signals from respective terminals in the other distributed base station.

Here, for example, as illustrated in FIG. 4A, to ensure an appropriate reception power difference, it is conceivable that each of the terminals 10A, 10B, and 10C performs a transmission power control operation such that a power difference of xdB is generated between signals received by the distributed base station DB1. However, even if such a transmission power control operation is performed, as illustrated in FIG. 4B, there is a possibility that a sufficient power difference cannot be obtained between the terminal 10B and the terminal 10C with a multiplexed signal received by the distributed base station DB2, and communication is disabled. The terminal 10 according to the embodiment has a configuration for solving such a problem.

Figure 5:
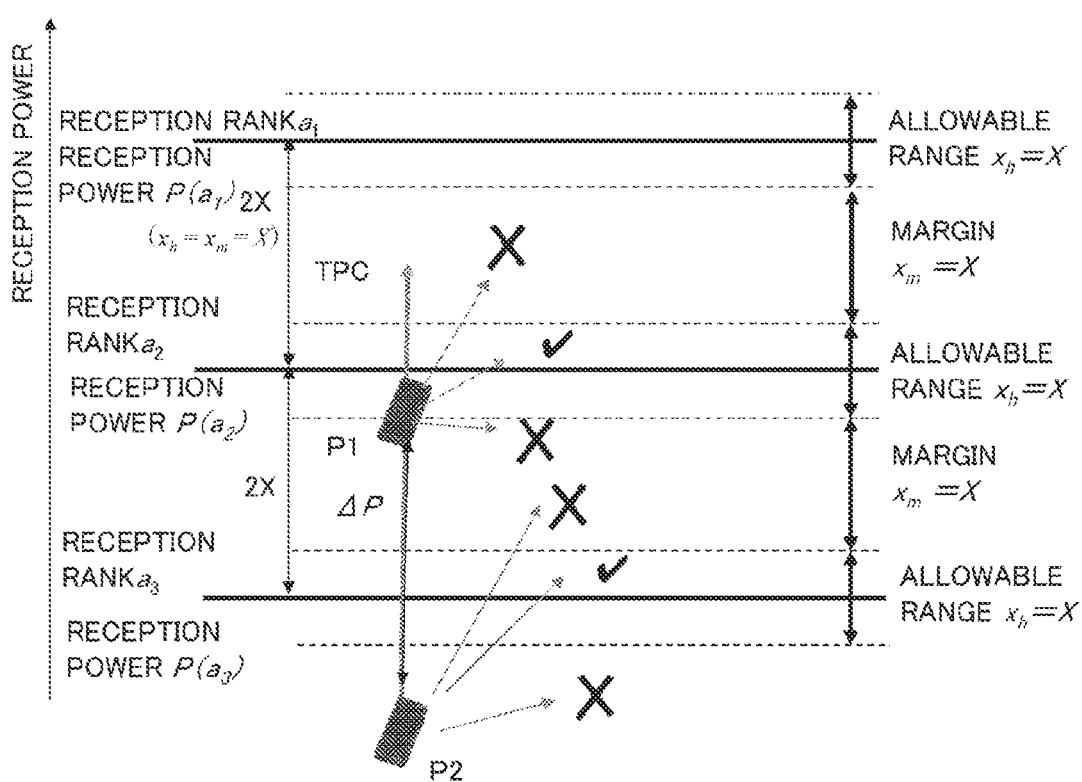
FIG. 5 is an explanatory diagram illustrating a transmission power control method for a terminal according to the embodiment.

FIGS. 5 to 11 are explanatory diagrams illustrating a transmission power control method for a terminal according to the embodiment. As described above, in the case of the distributed base station configuration, two signals transmitted from a single terminal 10 (each of the terminals 10A, 10B, and 10C) are received by two distributed base stations DB1 and DB2. FIG. 5 illustrates reception power P1 of a signal transmitted to the distributed base station DB1 and reception power P2 of a signal transmitted to the distributed base station DB2, from a single terminal 10. A power difference ΔP between the reception power P1 and P2 of these two signals is fixed regardless of the magnitude of transmission power.

Thus, as illustrated in FIG. 5, reception ranks are set (defined) for the reception power, and the reception power of the terminal 10 is set to fall within an allowable variation range (hereinafter, referred to as an "allowable range") of the reception power in each reception rank. Further, the reception power of the terminal 10 that falls in an area (margin) other than the allowable range is disallowed. In other words, in the transmission power control method according to the embodiment, an allowable range xh is provided in addition to a margin xm so that a power difference needed for PD-UL-NOMA can be obtained even with any ΔP. In addition, while ΔP between the signals is maintained, a transmission power control operation (adjustment (increase and decrease) of transmission power) is performed so that the reception power of each of the two signals is shifted up or down to fall within an allowable range.

As a result, while the number of terminals 10 whose signals can be multiplexed may decrease, the power difference needed for PD-UL-NOMA can be obtained. This allows the signals from each terminal 10 to be preferably separated and decoded. That is, it is possible to provide an effect that the base station 11 and the terminal 10 can communicate with each other or communication quality between the base station 11 and the terminal 10 is improved.

Figure 6:
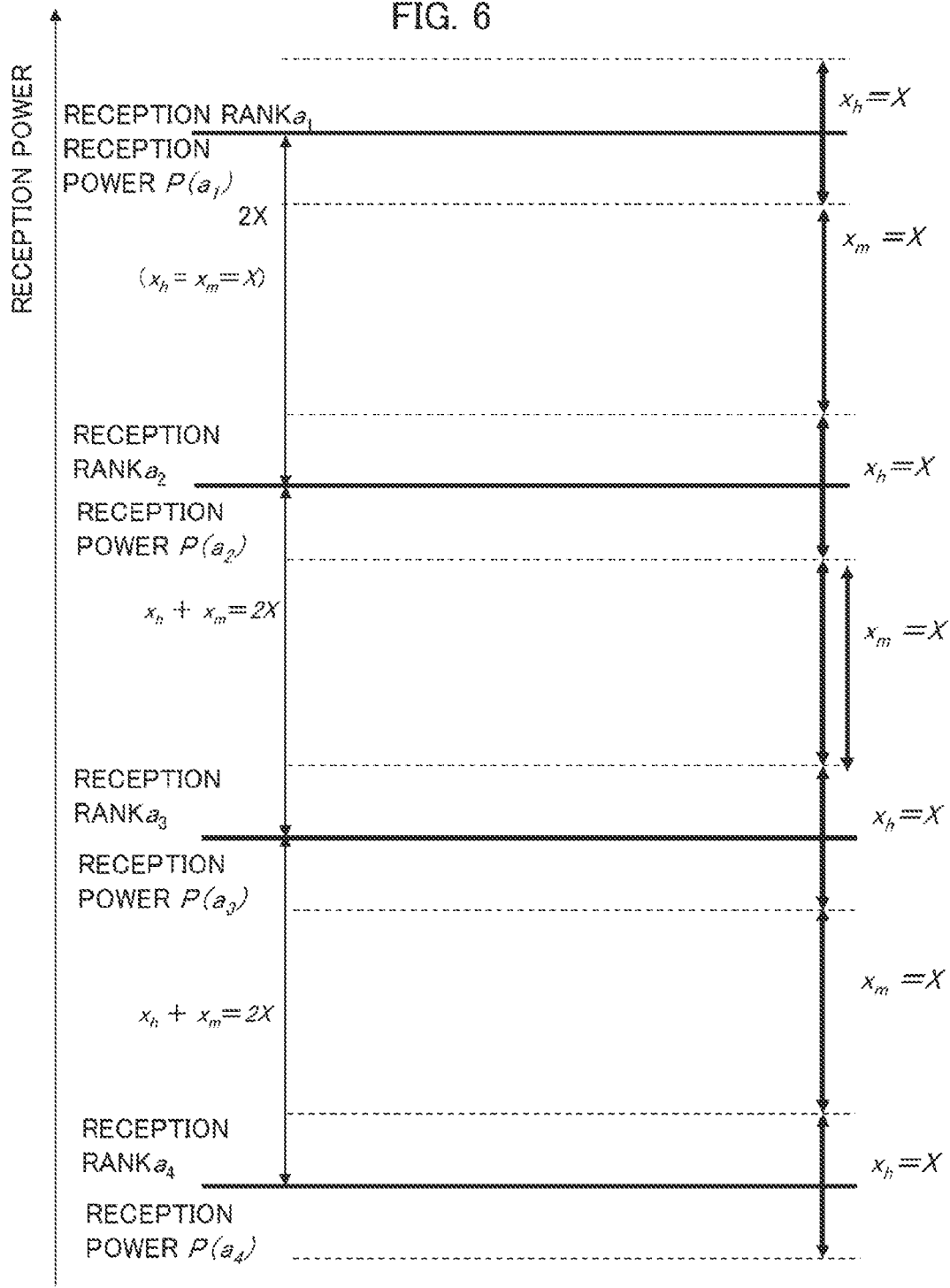
FIG. 6 is an explanatory diagram illustrating the transmission power control method for a terminal according to the embodiment.

As illustrated in FIG. 6, the reception power in the base station 11 is divided by a plurality of (N, which is an integer of at least 1,) reception ranks a1, a2, ..., aN. Each reception rank has a reception power value (P(a1) to P(aN)) and has an allowable range xh around the reception power value. The allowable range xh is equally divided by the reception power value of the reception rank and is defined as a range of ±xh/2 from the reception power value. A margin xm is provided between the lower limit of an allowable range in the upper reception rank of the two reception ranks adjacent to each other and the upper limit of an allowable range in the lower reception rank. The transmission power control operation is performed by a terminal 10 so that the reception power of two signals transmitted from the single terminal 10 fall within the allowable range of any of the reception ranks.

Figure 7:
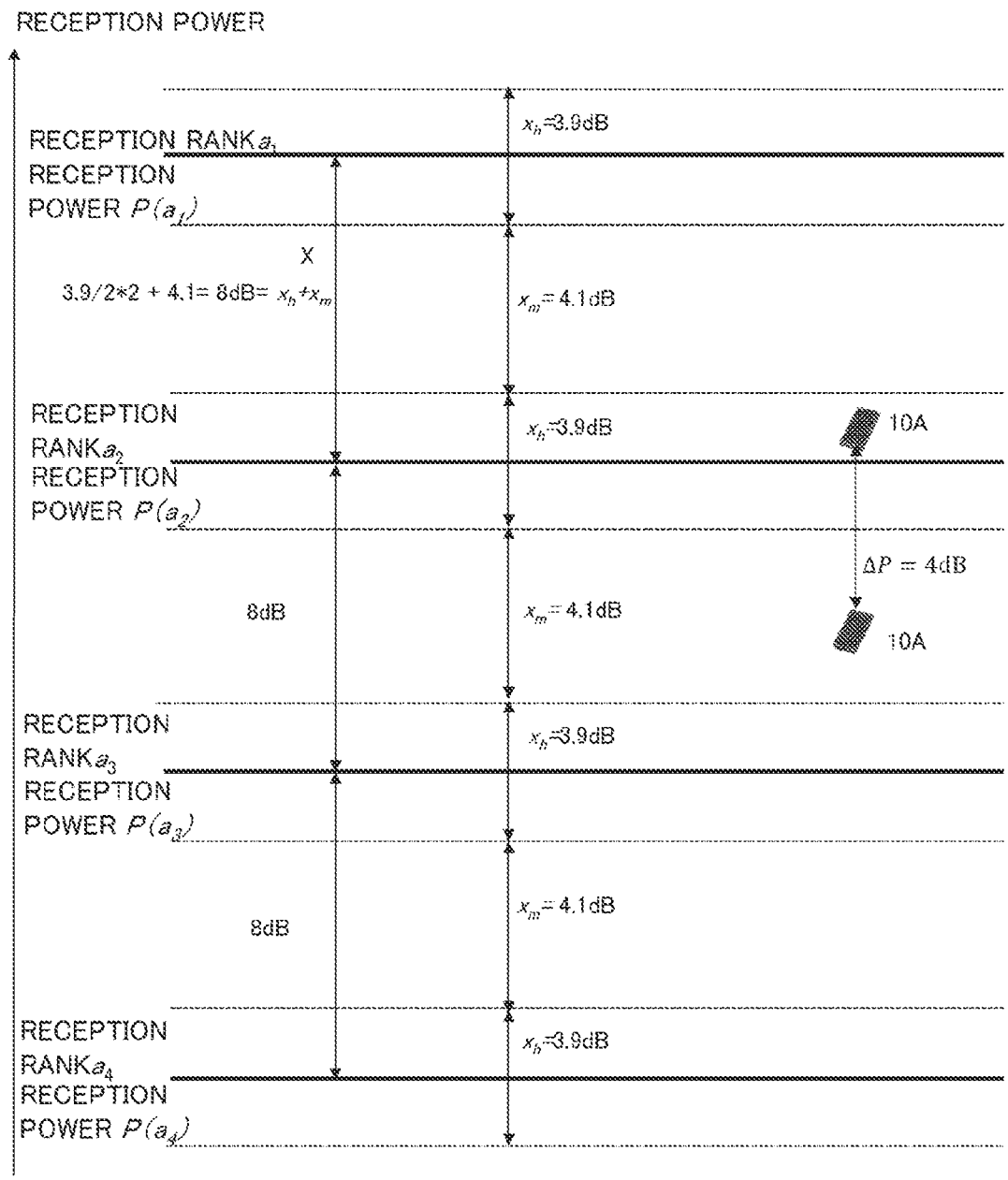
FIG. 7 is an explanatory diagram illustrating the transmission power control method for a terminal according to the embodiment.

The size of the allowable range xh is set to be equal to or larger than the size of the margin xm. For example, as illustrated in FIG. 7, there is a case where one of the two signals falls within the margin xm. Commonly, when the allowable range xh is smaller than the margin xm and ΔP=(xh+xm)/2, the reception power of one of the two signals falls within any of the margins in the distributed base station. Therefore, the size of the allowable range xh is set to be equal to or larger than the size of the margin xm. However, the narrower the allowable range xh is, the more accurately a power difference is given. For this reason, it is preferable that the size of the allowable range xh be equal to the size of the margin xm.

Thus, as illustrated in FIG. 6, in the present embodiment, allowable range xh=margin xm=X is set, and a reception power difference between the reception ranks adjacent to each other is set to be 2X. As an example, the reception power P(a1) of the highest reception rank a1 is set to, for example, −50 dBm, X=4 dB is set, and reception power is set to decrease by −8 dBm every time the reception rank is lowered by one. However, the value of the highest reception rank and the value of X are not limited to those described above.

Figure 8:
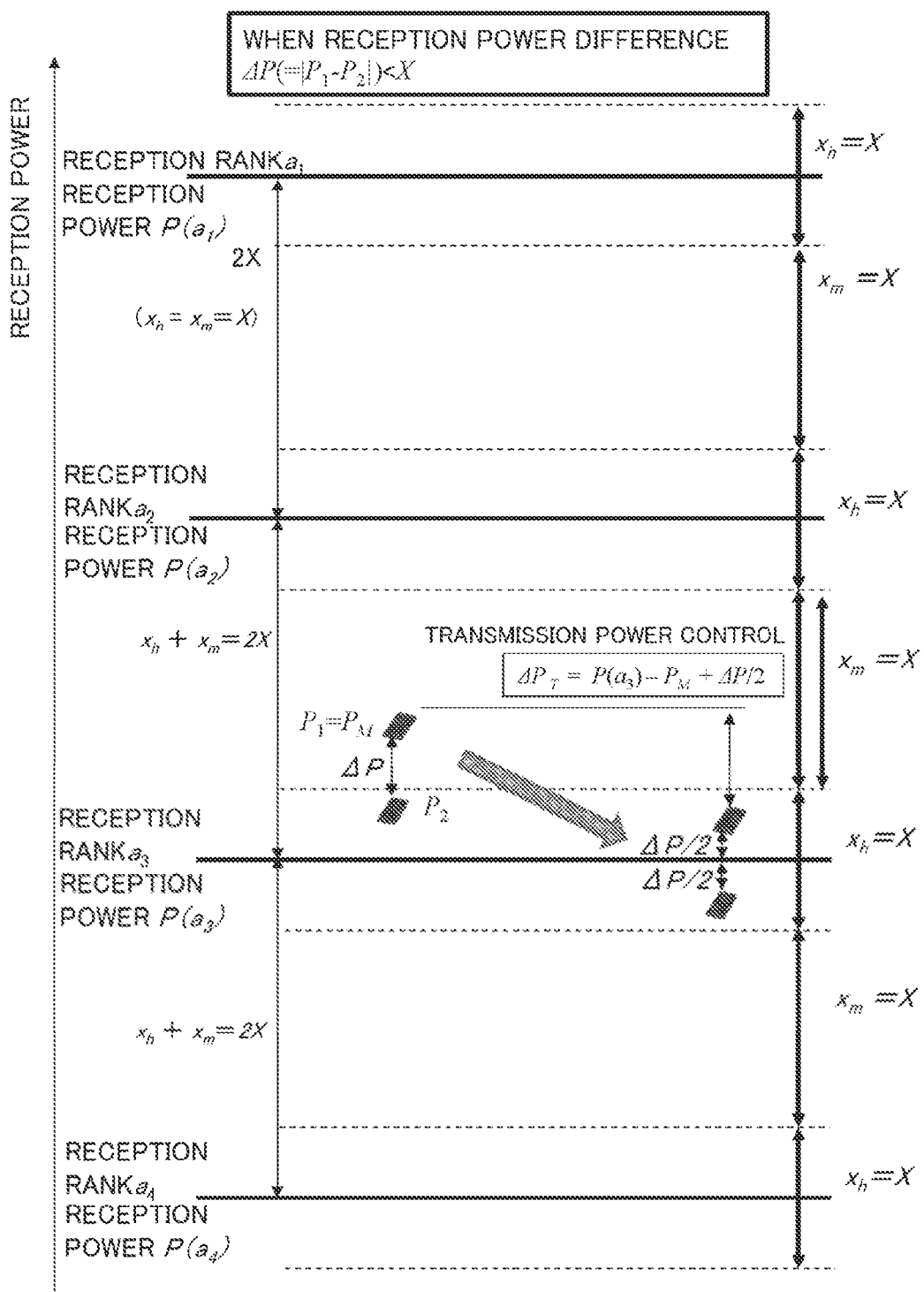
FIG. 8 is an explanatory diagram illustrating the transmission power control method for a terminal according to the embodiment.

FIG. 8 illustrates an example of a transmission power control method in a case where a reception power difference ΔP=(|P1−P2|)<X. P1 is the reception power of a signal (first signal) that the distributed base station DB1 receives from the terminal 10A, and P2 is the reception power of a signal (second signal) that the distributed base station DB2 receives from the terminal 10A (see FIG. 1).

In the case illustrated in FIG. 8, the reception power P1=PM of a signal that the distributed base station DB1 receives from the terminal 10A falls within the margin xm between the reception rank a2 and the reception rank a3. In this case, the terminal 10A specifies the reception rank that is closest to (that has the smallest difference from) the PM. In FIG. 8, the difference between the reception power P(a3) of the reception rank a3 and PM is smaller than the difference between the reception power P(a2) of the reception rank a2 and PM. Thus, the reception rank a3 is specified as the closest rank.

The terminal 10A obtains a transmission power adjustment value ΔPT obtained by calculating ΔPT=P(a3)−PM+ΔP/2 and performs a transmission power control operation so as to decrease the reception power by ΔPT. That is, the transmission power control operation is performed on the signal (first signal) directed to the distributed base station DB1 such that Pb is changed to a position that is higher than the reception power P(a3) of the reception rank a3 by ΔP/2. In addition, since ΔP is fixed, with the change made to Pb, the transmission power control operation is performed on the signal (second signal) directed to the distributed base station DB2 such that P2 is changed to a position that is lower than the reception power P(a3) of the reception rank a3 by ΔP/2.

As a result, the reception power of the signal that the distributed base station DB1 receives from the terminal 10A falls within the allowable range of the reception rank a3 in the distributed base station DB1. Further, the reception power of the signal that the distributed base station DB2 receives from the terminal 10A falls within the allowable range of the reception rank a3 in the distributed base station DB2. Since ΔP<X, the reception power of the two signals always falls within the allowable range xh.

Figure 9:
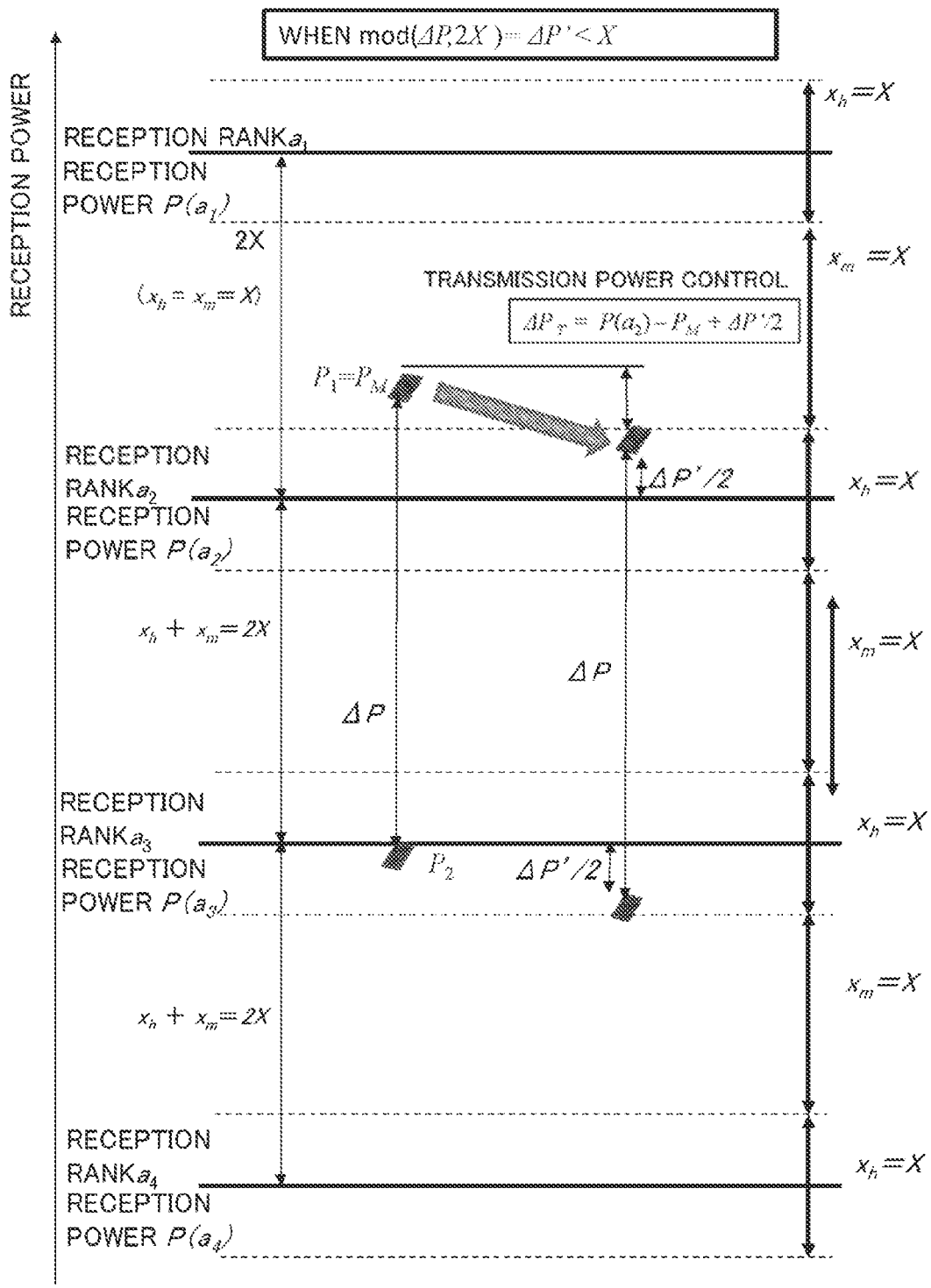
FIG. 9 is an explanatory diagram illustrating the transmission power control method for a terminal according to the embodiment.

FIG. 9 is a generalization of the case in FIG. 8 and illustrates a case where a remainder ΔP'=mod (ΔP,2X) obtained by dividing the power difference ΔP by 2X is smaller than X. In the case illustrated in FIG. 9, the terminal 10A obtains a transmission power adjustment value ΔPT by calculating ΔPT=P(a2)−PM+ΔP'/2 (where P1=PM) and performs the transmission power control operation so as to decrease the reception power of each of the two signals by ΔPT. As a result, the reception power of the signal that the distributed base station DB1 receives from the terminal 10A falls within the allowable range of the reception rank a2 in the distributed base station DB1. Further, the reception power of the signal that the distributed base station DB2 receives from the terminal 10A falls within the allowable range of the reception rank a3 in the distributed base station DB2.

Figure 10:
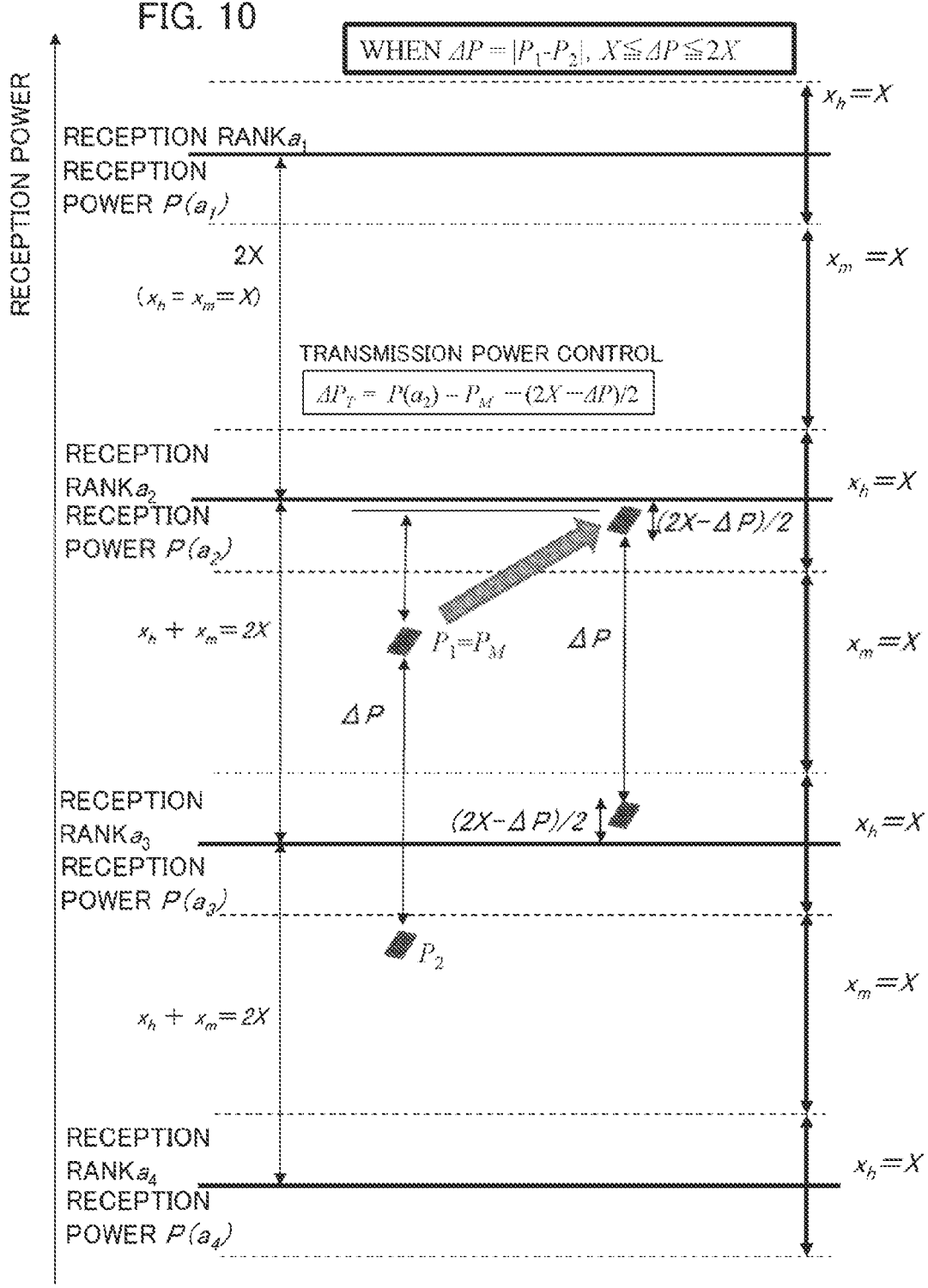
FIG. 10 is an explanatory diagram illustrating the transmission power control method for a terminal according to the embodiment.

FIG. 10 illustrates a case where the power difference ΔP is equal to or larger than X and equal to or smaller than 2X. In the case illustrated in FIG. 10, the terminal 10A obtains a transmission power adjustment value ΔPT by calculating ΔPT=P(a2)−PM−(2X−ΔP)/2 (where P1=PM) and performs the transmission power control operation so as to increase the reception power of each of the two signals by ΔPT. That is, the transmission power control operation is performed on the signal (first signal) directed to the distributed base station DB1 such that P1 is changed (raised) to a position that is lower than the reception power P(a2) of the reception rank a2 by (2X−ΔP)/2. In addition, since ΔP is fixed, with the change made to P1, the transmission power control operation is performed on the signal (second signal) directed to the distributed base station DB2 such that P2 is changed (raised) to a position that is higher than the reception power P(a3) of the reception rank a3 by ΔP/2. As described above, when the transmission power is adjusted in a direction of increasing by the transmission power control operation, PM is changed to a position that is lower than the reception power of the closest reception rank. In contrast, when the transmission power is adjusted in a direction of decreasing by the transmission power control operation, PM is changed to a position that is higher than the reception power of the closest reception rank (see FIG. 8).

As a result, the reception power of the signal that the distributed base station DB1 receives from the terminal 10A falls within the allowable range of the reception rank a2 in the distributed base station DB1. Further, the reception power of the signal that distributed base station DB2 receives from the terminal 10A falls within the allowable range of the reception rank a3 in the distributed base station DB2.

Figure 11:
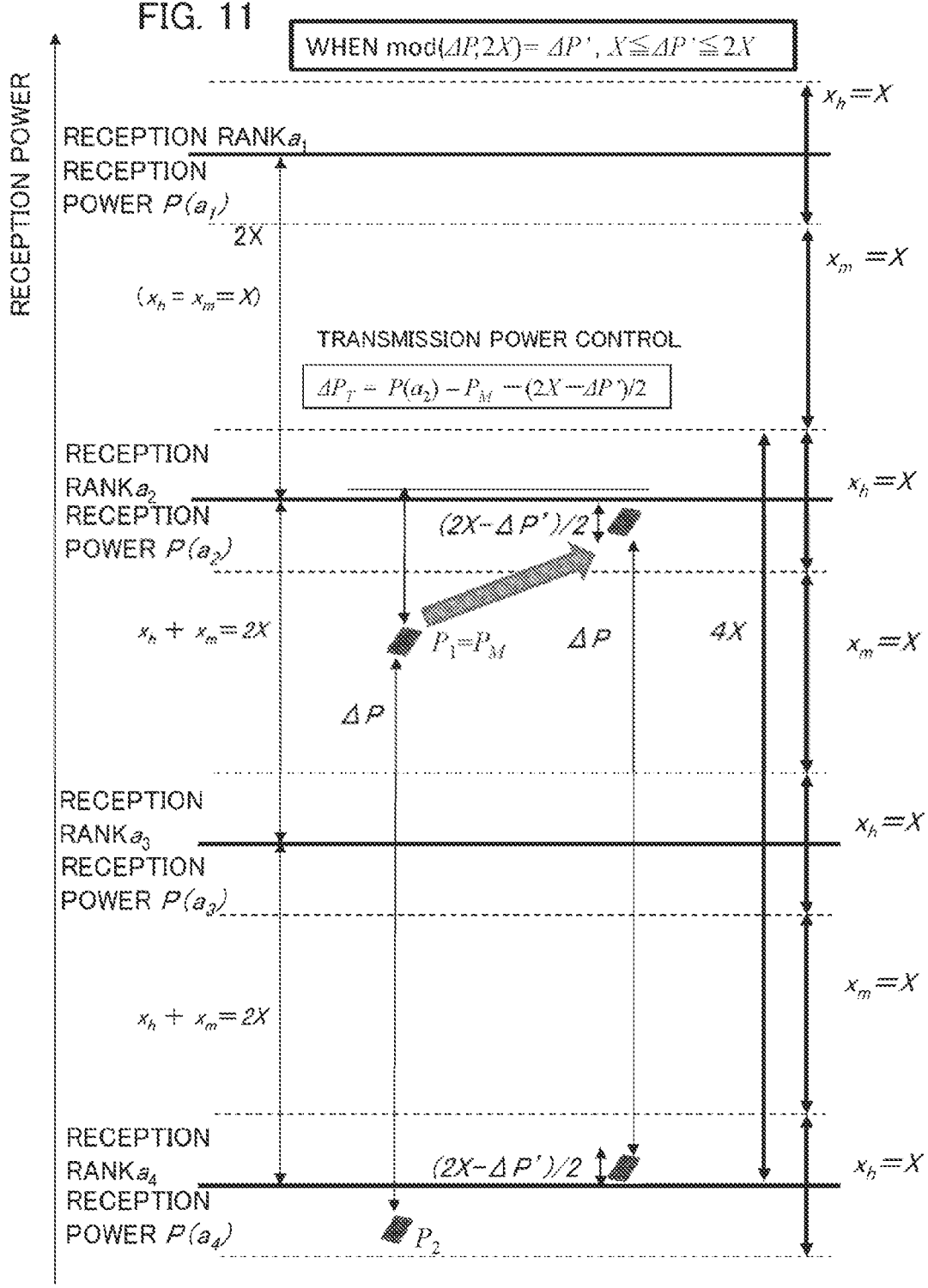
FIG. 11 is an explanatory diagram illustrating the transmission power control method for a terminal according to the embodiment.

FIG. 11 is a generalization of the case in FIG. 10 and illustrates a case where a remainder ΔP' described above is equal to or larger than X and equal to or smaller than 2X. In the case illustrated in FIG. 10, the terminal 10A obtains a transmission power adjustment value ΔPT by calculating ΔPT=P(a2)−PM−(2X−ΔP')/2 (where P1=PM) and performs the transmission power control operation so as to increase the reception power of each of the two signals by ΔPT. As a result, the reception power of the signal that the distributed base station DB1 receives from the terminal 10A falls within the allowable range of the reception rank a2 in the distributed base station DB1, and the reception power of the signal that the distributed base station DB2 receives from the terminal 10A falls within the allowable range of the reception rank a3 in the distributed base station DB2.

Figure 12:
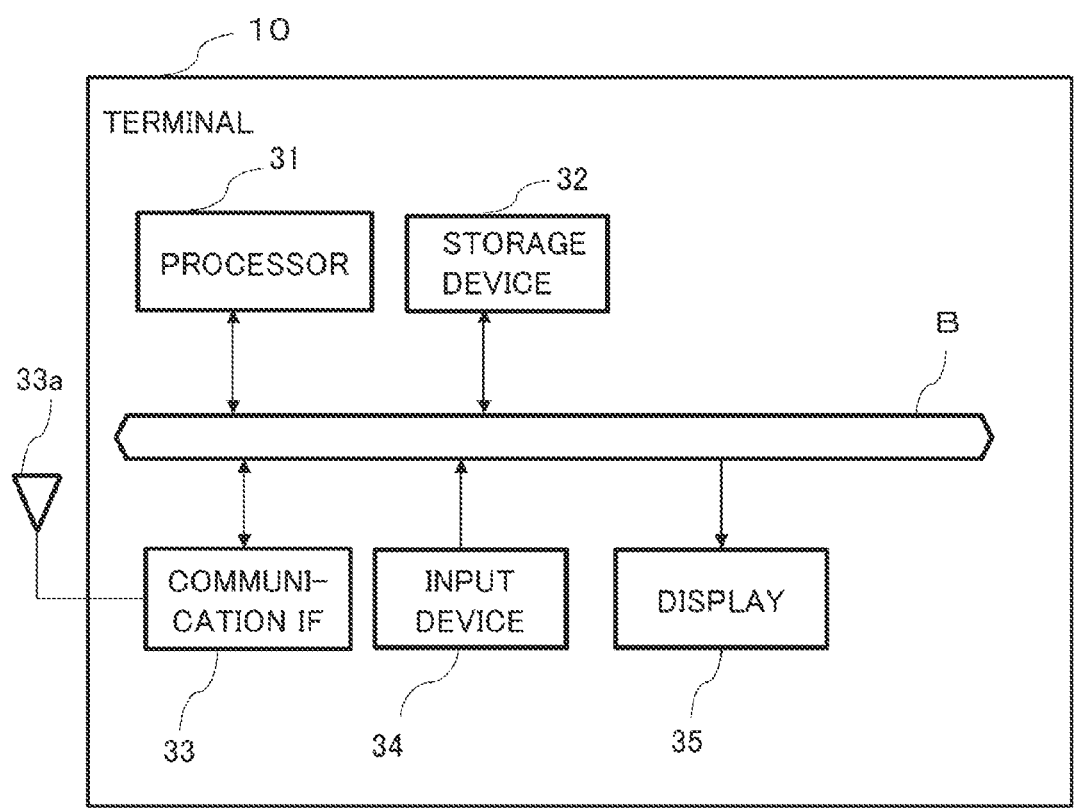
FIG. 12 illustrates an example of a configuration of a terminal according to the embodiment.

FIG. 12 illustrates an example of a configuration of the terminal 10 according to the embodiment. In FIG. 12, the terminal 10 includes a processor 31 (an example of a controller), a storage device 32, a communication interface (communication IF) 33, an input device 34, and a display 35, which are connected to each other via a bus B.

The storage device 32 includes a main storage device and an auxiliary storage device. The main storage device is used as, for example, a storage area for programs and data, a work area for the processor 31, or a buffer area for temporarily storing communication data. The main storage device includes, for example, a random access memory (RAM), or a combination of a RAM and a read-only memory (ROM). The auxiliary storage device is used for storing programs and data. The auxiliary storage device is, for example, a hard disk, a solid state drive (SSD), or an electrically erasable programmable read-only memory (EEPROM). However, the type of the storage device 32 is not limited to the above example.

The communication IF 33 is a communication circuit that supports a predetermined radio communication standard such as 5G. The communication IF 33 is connected to an antenna 33a that transmits and receives radio signals and can generate radio signals in accordance with PD-UL-NOMA and transmit the radio signals to each of the distributed base stations DB1 and DB2.

The input device is, for example, a key, a button, or a pointing device and is used for inputting information and data. The display 35 is used for displaying information and data.

The processor 31 is, for example, a central processing unit (CPU) or a microprocessor unit (MPU). The processor 31 is not limited to a single processor and may have a multi-core processor configuration. Further, the processor 31 may be a single physical CPU connected by a single socket having a multi-core processor configuration. Furthermore, the processor 31 may include a processor other than a CPU, such as a digital signal processor (DSP) or a graphics processing unit (GPU). The processor 31 may also cooperate with an integrated circuit (IC), other digital circuits, or analog circuits. The integrated circuit is, for example, an LSI, an application specific integrated circuit (ASIC), or a programmable logic device (PLD). The PLD includes, for example, a field-programmable gate array (FPGA), or the like. The processor 31 may be, for example, a circuit called a microcontroller (MCU), a system-on-a-chip (SoC), a system LSI, or a chipset.

Figure 13:
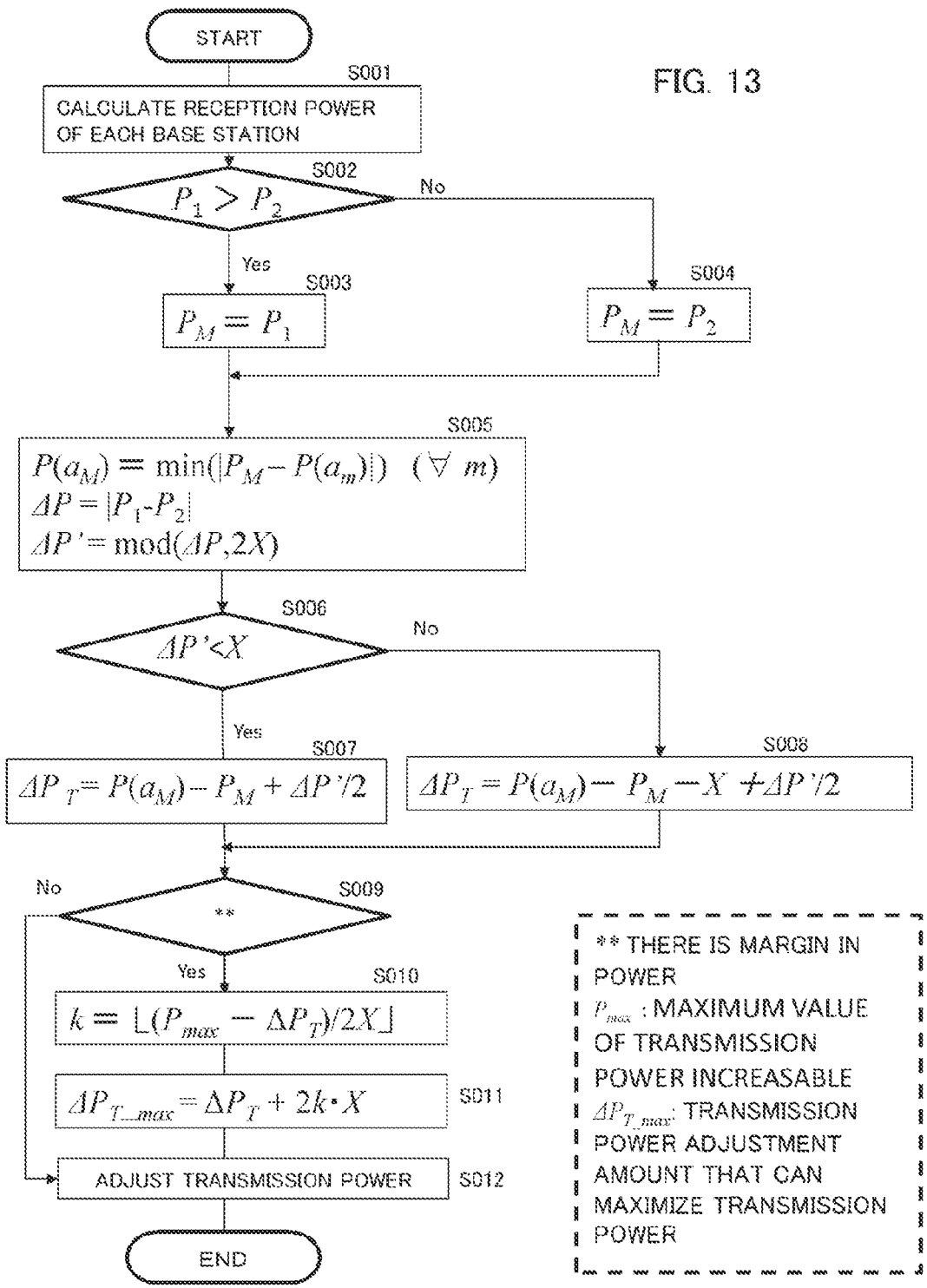
FIG. 13 is a flowchart illustrating an example of processing performed by a terminal according to the embodiment.

By executing a program, the processor 31 performs the transmission power control operation on a signal to be transmitted to a distributed base station by using the transmission power control method described above. FIG. 13 is a flowchart illustrating an example of processing performed by the terminal 10 according to the embodiment. The processing in the flowchart illustrated in FIG. 13 is performed when the terminal 10 transmits data.

In step S001, the processor 31 of the terminal 10 receives, from a plurality of base stations 11 capable of communicating with the terminal 10, information for calculating reception power of a signal from the terminal 10 in each base station 11 and uses the information to calculate reception power P1 of a signal from the terminal 10 in the base station 11 corresponding to the distributed base station DB1 and reception power P2 of a signal from the terminal 10 in the base station 11 corresponding to the distributed base station DB2.

In step S002, the processor 31 determines whether the reception power P1 is larger than the reception power P2. If the reception power P1 is determined to be larger than the reception power P2, the processing proceeds to step S003, and if not, the processing proceeds to step S004. In step S003, the value of P1 is set to PM. In step S004, the value of P2 is set to PM.

In step S005, the processor 31 obtains reception power P(aM), a power difference ΔP, and a remainder ΔP'. The reception power P(aM) indicates reception power closest to PM. ΔP and ΔP' are as described above.

In step S006, the processor 31 determines whether ΔP' is smaller than X=xm. If ΔP' is determined to be smaller than X, the processing proceeds to step S007, and if not, the processing proceeds to step S008.

In step S007, a transmission power adjustment value ΔPT in a case where ΔP'<X is calculated, and a transmission power control operation is performed using the calculated ΔPT. In step S008, a transmission power adjustment value ΔPT in a case where ΔP'>X is calculated, and a transmission power control operation is performed using the calculated ΔPT.

In the formula in step S007 illustrated in FIG. 13, since it is assumed that the reception power of the closest reception rank is smaller than PM, "+ΔP'/2" is applied. In contrast, if the reception power of the closest reception rank is larger than PM, "−ΔP'/2" is applied. In the formula in step S008, since the reception power of the closest reception rank is larger than PM, "−X+ΔP'/2" is applied. However, if the reception power of the closest reception rank is larger than PM, "+X−ΔP'/2" is applied.

In step S009, the processor 31 determines whether there is a margin in transmission power. If it is determined that there is a margin in the transmission power, the processing proceeds to step S010, and if not, the processing proceeds to step S012.

When the processing proceeds to step S010, the processor 31 calculates ΔPT_max (steps S010 and S011). Here, Pmax indicates a maximum value of transmission power that can be increased, and ΔPT_max indicates a transmission power adjustment value that can maximize transmission power. When there is a margin in power, the processor 31 calculates a transmission power adjustment amount such that the maximum reception rank in the range of Pmax is obtained.

In step S012, the processor 31 performs a transmission power control operation using the transmission power adjustment value ΔPT or ΔPT_max. That is, the processor 31 changes (increases or decreases) the transmission power used for transmitting signals from the terminal 10 to the distributed base stations DB1 and DB2 in accordance with ΔPT or ΔPT_max. As a result, the reception power of the signals from the terminal 10 in the distributed base stations DB1 and DB2 falls within the allowable range xh.

The processing illustrated in FIG. 13 is performed by each of the terminals 10A, 10B, and 10C in the example illustrated in FIG. 1. In this processing, the transmission power is adjusted in each of the terminals 10A, 10B, and 10C so that each of the distributed base stations DB1 and DB2 receives signals (multiplexed signals) having a reception power difference equal to or larger than the margin xm from the terminals 10A, 10B, and 10C. As a premise of the processing illustrated in FIG. 13, initial values of the transmission power (transmission power before the adjustment) and ΔP of the first and second signals used by the terminals 10A, 10B, and 10C are determined in advance. Alternatively, the terminals 10A, 10B, and 10C may receive, from the distributed base station DB1 or the like, an instruction about transmission with transmission power that ensures a sufficient reception power difference (see FIG. 4A).

When the transmission power for the distributed base station DB1 is determined, since ΔP is fixed, the transmission power for the distributed base station DB2 is also determined. The terminals 10A, 10B, and 10C receive, from the distributed base stations DB1 and DB2, information for calculating reception power for signals to be transmitted to the distributed base stations DB1 and DB2 with such transmission power and calculates reception power P1 and reception power P2 in step S001. However, a method other than the above method may be used to transmit signals having a power difference by the terminals 10A, 10B, and 10C.

Each of the plurality of terminals 10 that transmit signals in parallel to the distributed base stations DB1 and DB2 performs the processing illustrated in FIG. 13 so as to determine reception ranks of the signals of each terminal 10. Such information is managed by a control station of the distributed base stations DB1 and DB2 and provided to each of the terminals 10 from one of the distributed base stations DB1 and DB2.

Figures 14A, 14B:
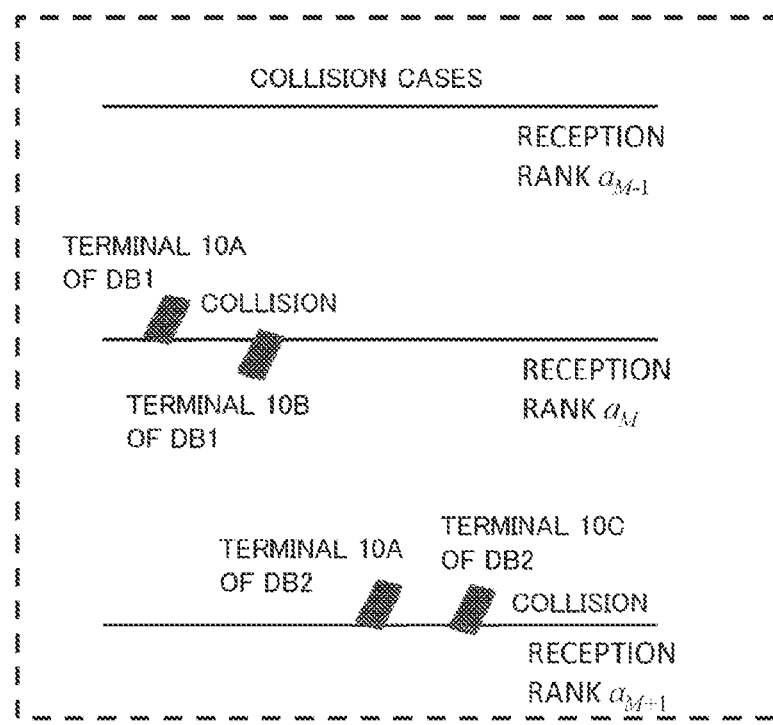
FIGS. 14A and 14B are explanatory diagrams illustrating a method for reducing the possibility of collision between terminals in distributed base stations according to the embodiment, and specifically.

FIG. 14A illustrates an example of connected terminal number information provided to the terminal 10. In FIG. 14A, the connected terminal number information indicates the number connected terminals 10 in the distributed base station DB1 and the number of connected terminals 10 in the distributed base station DB2 for each reception rank. The number of connected terminals indicates the number of connected terminals per unit time and is calculated on the assumption that each terminal 10 transmits a signal at a probability of J times per unit time in accordance with the Poisson distribution.

FIG. 14B illustrates examples of collisions in reception ranks. One example in FIG. 14B illustrates a collision that occurs when the reception power of the terminal 10A connected to the distributed base station DB1 and the reception power of the terminal 10B connected to the distributed base station DB1 fall within the allowable range of a certain reception rank aM. The other example illustrates a collision that occurs when the reception power of the terminal 10A connected to the distributed base station DB2 and the reception power of the terminal 10C connected to the distributed base station DB2 fall within the allowable range of a reception rank aM+1. When a collision occurs, since decoding for the terminal 10 involved in the collision is not properly performed, communication is disabled. In the distributed base station configuration, when no collision occurs to signals received by either one of the distributed base stations DB1 and DB2, the signals can be properly decoded (communicated).

FIGS. 15 to 17 are explanatory diagrams illustrating a method for reducing the possibility of collision between terminals in distributed base stations according to the embodiment. FIG. 15 illustrates the connected terminal number information and the sum of the numbers of terminals connected to two distributed base stations. The terminal 10 according to the embodiment uses the connected terminal number information and performs the following processing so as to reduce the possibility of occurrence of collision of signals transmitted from the own terminal.

The example in FIG. 15 illustrates a case where, as a set of reception ranks, the reception rank of a signal transmitted from the terminal 10A in the distributed base station DB1 is a reception rank aM, and the reception rank in the distributed base station DB2 is a reception rank aM+2, which is two ranks lower than the reception rank in the distributed base station DB1. The number of connected terminals at the reception rank aM is 500, the number of connected terminals at the reception rank aM+2 is 500, and the sum (total value) Yd of these numbers is 1000. When the set of the reception ranks described above is lowered by one by decreasing the transmission power, the reception rank in the distributed base station DB1 becomes a reception rank aM+1, and the reception rank in the distributed base station DB2 becomes a reception rank aM+3. The sum Yd of the numbers of connected terminals in the set of these reception ranks is 500. In this way, when the set of reception ranks are lowered by two to four, the sum Yd of the numbers of connected terminals will be 300, 200, and 100, respectively. The smaller the value of the sum Yd is, the less likely a collision occurs.

Thus, the terminal 10 determines whether the reception rank needs to be shifted to a lower rank and determines a reception rank to be shifted to when the shift is needed. For this processing, as illustrated in FIG. 16, an average value Yave of sums Yd, a difference ΔYd=Yd−Yave from the average value, a probability (shift probability) Po=(Yd−Yave)/Yd of shifting to a lower reception rank, and a probability (shift destination probability) PI=−ΔYd/Zsum of shifting from an upper reception rank. −ΔYd indicates an absolute value of ΔYd having a negative value, and Zsum indicates the sum (total value) of the absolute values of ΔYd having negative values. The table of connected terminal number and the table indicating a relationship between the rank order and the sum Yd of the numbers of connected terminals illustrated in FIG. 15 can be generalized by characters illustrated in FIG. 17.

Figure 18:
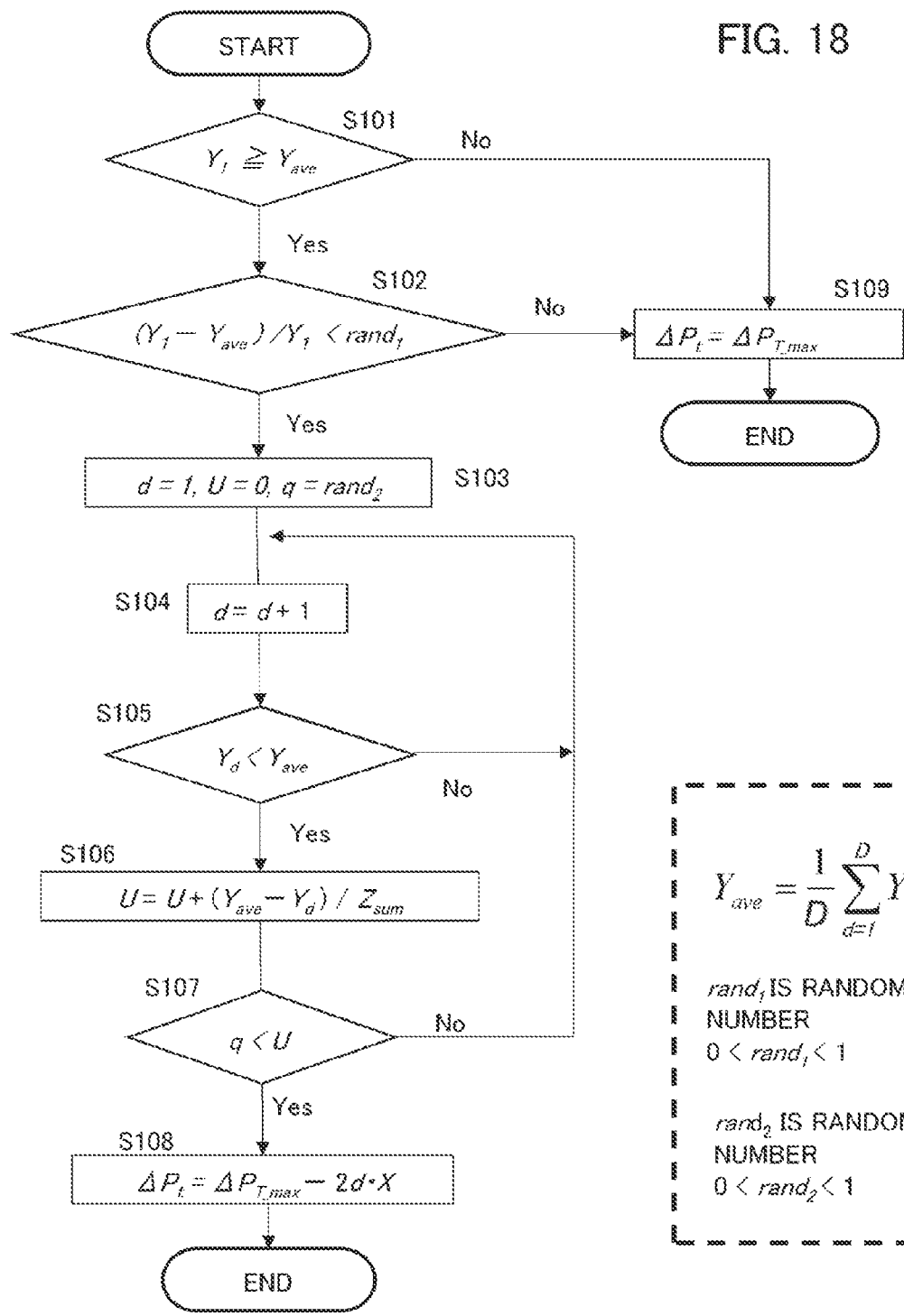
FIG. 18 is a flowchart illustrating an example of processing performed by a terminal according to the embodiment.
Figure 19:
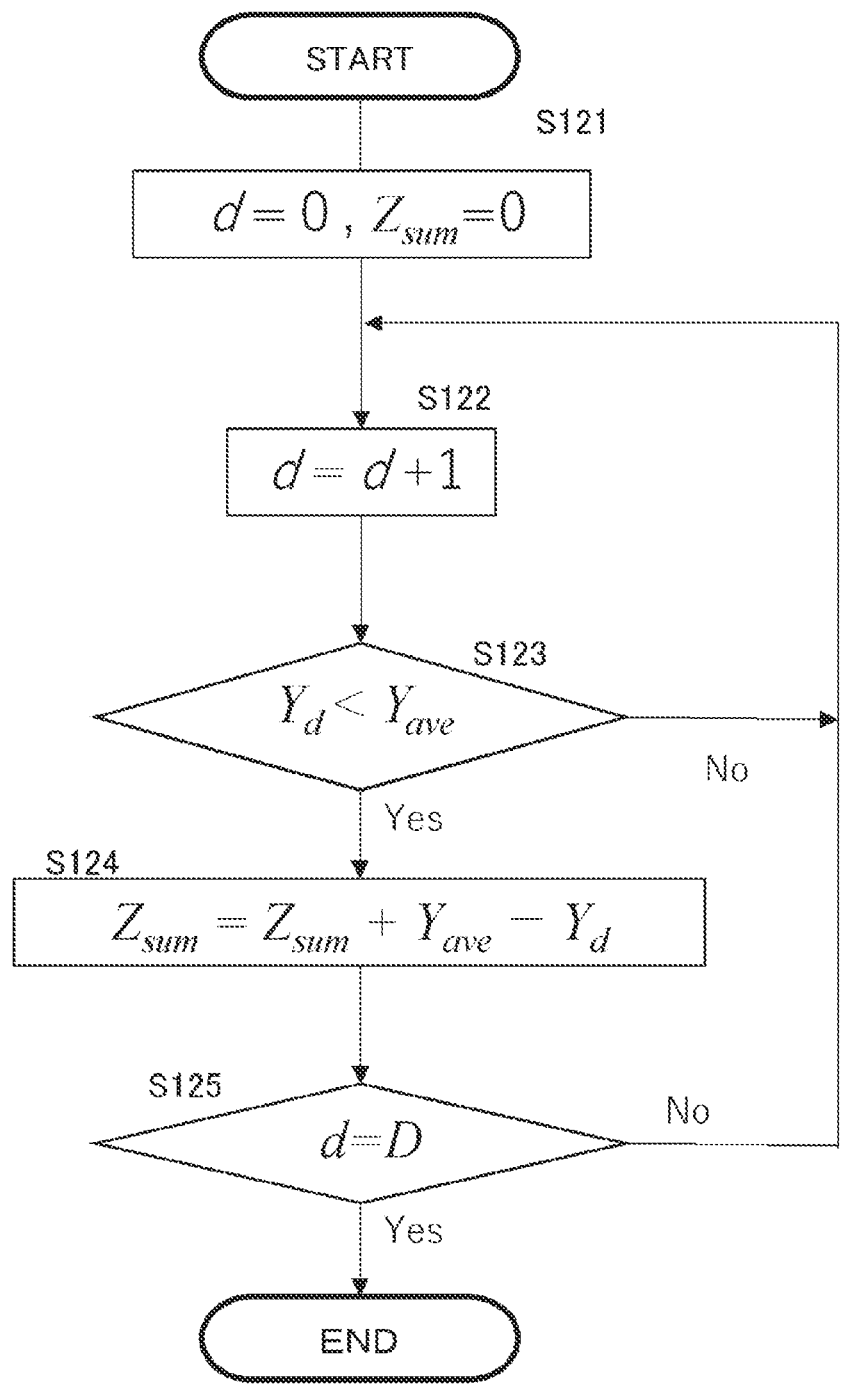
FIG. 19 is a flowchart illustrating an example of processing performed by a terminal according to the embodiment.

FIGS. 18 and 19 are flowcharts illustrating examples of processing for collision probability reduction in the terminals 10. The processing in FIGS. 18 and 19 is performed by the processor 31 executing a program at appropriate timing.

In step S101, the processor 31 determines whether the value of a sum Y1 in the distributed base station DB1 obtained from the connected terminal number information is equal to or larger than an average value Yave. If Y1 is determined to be equal to or larger than Yave, the processing proceeds to step S102, and if not, the processing proceeds to step S109. The fact that the processing proceeds from step S101 to step S109 means that the sum does not exceed the average value and that it is determined that the reception rank does not need to be lowered (shift to a lower rank).

In step S109, a transmission power adjustment amount $\Delta PT$ is set to $\Delta PT\_max$, and the processor 31 performs a transmission power control operation in accordance with the transmission power adjustment amount $\Delta PT$ (step S109). However, the value of $\Delta PT$ may be used instead of $\Delta PT\_max$.

In steps S102, the processor 31 determines whether a probability PO according to the rank order 1 (Y1) obtained from the connected terminal number information is smaller than a random number rand1. The random number rand1 is larger than 0 and smaller than 1. If the probability PO is determined to be smaller than the random number rand1, the processing proceeds to steps S103, and if not, the processing proceeds to step S109. The processing randomly proceeds from steps S102 to step S109 in accordance with the shift probability Po (an example of a first probability), using the random number rand1. As a result, the number of connected terminals is distributed between the terminal 10 to be shifted and the terminal 10 that remains without being shifted.

In step S103, for example, the processor 31 sets the value of d indicating the rank order managed by using the storage device 32 to 1, sets the value of U to 0, and sets the value of q indicating a random number to a value specifying a random number rand2. The random number rand2 is larger than 0 and smaller than 1.

In step S104, the processor 31 increments the value of d. In step S105, the processor 31 determines whether the sum Yd of the numbers of connected terminals is smaller than the average value Yave. If Yd is determined to be smaller than Yave, the processing proceeds to step S106, and if not, the processing returns to step S104. In this way, the shift to the reception rank in which the value of Yd is equal to or larger than the average value Yave is skipped.

In step S106, the processor 31 sets the value of U to the value of the probability of shift destination PI corresponding to the value of Yd at that time. In step S107, the processor 31 determines whether the value of U is larger than the random number rand2. If the value of U is determined to be larger than the random number rand2, the processing proceeds to step S108, and if not, the processing proceeds to step S104. In step S107, the rank order of a shift destination is randomly allocated in accordance with the probability of shift destination PI (an example of a second probability) by using the random number rand2.

In step S108, the processor 31 calculates a value obtained by lowering the reception rank by at least one as a transmission power adjustment amount $\Delta PT$ and performs the transmission power control operation. In this way, when the sum Yd of the numbers of connected terminals exceeds the average value Yave, the reception rank is shifted to a lower reception rank with a predetermined probability.

FIG. 19 is a flowchart for calculating Zsum. In step S121, the processor 31 sets the values of d and Zsum to 0. In step S122, the processor 31 increments the value of d.

In step S123, the processor 31 determines whether Yd is smaller than Yave. If Yd is determined to be smaller than Yave, the processing proceeds to step S124, if not, the processing returns to step S122. In this way, when $\Delta Yd$ has a negative value, the processing proceeds to step S124.

In step S124, the processor 31 obtains the sum of the absolute values of negative $\Delta Yd$ by setting the value of Zsum to the value of "Zsum+Yave−Yd". In step S125, the processor 31 determines whether d reaches D indicating the lowest rank order. If it is determined that d=D, the processing in FIG. 19 ends, and the current value of Zsum is used in the processing of step S106 as the final value of Zsum. In step S125, if it is determined that d=D is not satisfied, the processing returns to step S122.

Figure 20:
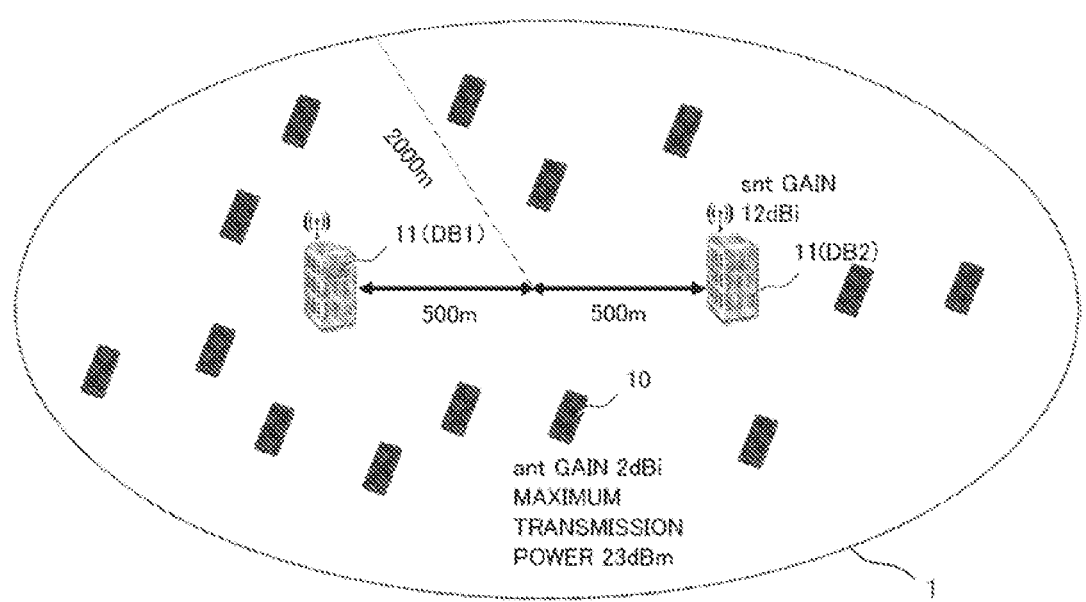
FIG. 20 is an explanatory diagram of a simulation as an example.

FIGS. 20 and 21 are explanatory diagrams illustrating a simulation as a practical example. In FIG. 20, base stations 11, which are the distributed base stations DB1 and DB2, are located in a cell 1 having a cell radius of 2000 m, at respective positions each separated by 500 m from the center of the cell 1 in opposite directions. The antenna gain of the base station 11 is 12 dBi, and the antenna gain of the terminal 10 is 2 dBi. The maximum transmission power of the terminal 10 is 23 dBm. FIG. 21 illustrates simulation parameters in tabular format. The parameters include the number of base stations 11, the number of antennas of a distributed base station, the number of terminals 10, the transmission frequency of a terminal 10, the number of transmission slots per second, the number of reception ranks, the number of antennas of a terminal 10, cell radius, displacement of each base station from cell center, long interval variation, short interval variation, instantaneous value variation, the antenna gain of a base station 11, the antenna gain of a terminal 10, and the maximum terminal output.

Figure 22:
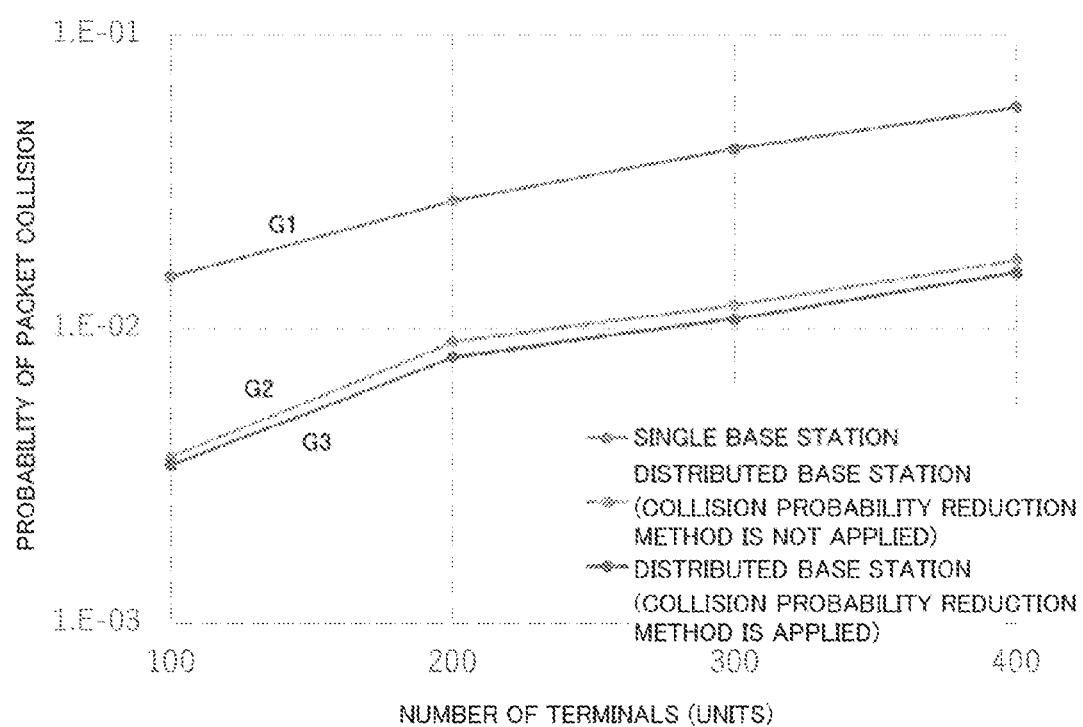
FIG. 22 is a graph illustrating a result of the simulation.

FIG. 22 is a graph indicating a result of the simulation. The horizontal axis of the graph represents the number of terminals, and the vertical axis represents the packet collision probability. A graph G1 represents a result obtained for one base station 11. A graph G2 represents a result obtained in a case where the processing (collision probability reduction method) of FIG. 18 is not applied in two distributed base stations. A graph G3 represents a result obtained in a case where the collision probability reduction method is applied. The graphs G2 and G3 represent a probability in a case where no collision occurs in one of the two distributed base stations. The graphs G2 and G3 indicate that the probability of occurrence of collision of reception ranks can be reduced by applying the collision probability reduction method.

In the wireless communication system according to the embodiment, a terminal 10 (each of the terminals 10A, 10B, and 10C) capable of transmitting a first signal received by a distributed base station DB1 (first base station) and a second signal received by a distributed base station DB2 (second base station) by PD-UL-NOMA performs a transmission power control operation. In the transmission power control operation, as illustrated in FIG. 6, reception power is divided into at least two reception ranks (ranks) at equal intervals, and each of the at least two reception ranks has an allowable variation range xh having an identical size. A margin xm is set between a lower limit of the allowable variation range xh in an upper rank a1 and an upper limit of the allowable variation range in a lower rank a2, the upper rank (for example, reception rank a1) and the lower rank (for example, reception rank a2) being adjacent to each other in the at least two reception ranks. The same applies between reception ranks a2 and a3 and between reception ranks a3 and a4.

The size of the allowable variation range xh is equal to or larger than the size of the margin xm (in FIG. 6, xh=xm). The terminal 10 calculates a transmission power adjustment amount ΔPT for the first signal and the second signal such that reception power P1 of the first signal and reception power P2 of the second signal fall within the allowable variation range xh of any of the reception ranks a1 to a4 by using the reception power P1 of the first signal, the reception power P2 of the second signal, a reception power difference ΔP between the first signal and the second signal, the reception ranks a1 to a4 (at least two ranks), the allowable variation range xh, and the margin xm (FIG. 13). Further, the terminal 10 adjusts transmission power of the first signal and the second signal in the terminal 10 by using the transmission power adjustment amount ΔPT.

Such an operation is performed by each of the terminals 10A, 10B, and 10C (the plurality of terminals 10) connected to the distributed base stations DB1 and DB2 (first and second base stations). Accordingly, each of the distributed base stations DB1 and DB2 can receive a signal in which signals from the terminals 10A, 10B, and 10C are multiplexed in a state in which an appropriate reception power difference is ensured. That is, when the terminals 10A, 10B, and 10C transmit signals to the respective distributed base stations DB1 and DB2, it is possible to ensure an appropriate reception power difference between the terminals in the distributed base stations DB1 and DB2.

In the embodiment, it is defined that the allowable variation range xh=margin xm=X and that the size between the reception ranks is set to 2X (FIG. 6). With such a configuration, an accurate power difference can be provided.

As illustrated in FIGS. 8 and 13, when the reception power difference ΔP between the reception power P1 of the first signal and the reception power P2 of the second signal is smaller than the allowable variation range xh, the terminal 10 (the processor 31 serving as a controller of the terminal 10) according to the embodiment specifies, from the reception ranks a1 to a4, a reception rank a3 closest to first reception power (PM), which is reception power having a larger value between P1 and P2. Next, the terminal 10 calculates a transmission power adjustment amount ΔPT such that P1 and P2 fall within the allowable variation range xh of the closest reception rank a3. In this way, a sufficient power difference can be ensured in each base station.

As illustrated in FIGS. 9 and 13, when a remainder ΔP' obtained by dividing the reception power difference ΔP between the first signal and the second signal by a value 2X, which is obtained by doubling a total value X of the size of the allowable variation range xh and the size of the margin xm, is smaller than the total value X, the terminal 10 according to the embodiment performs the following. That is, the terminal 10 specifies, from the reception ranks a1 to a4, the reception rank a2 closest to PM, which is a larger value between P1 and P2. Further, the terminal 10 calculates a value obtained by adding or subtracting "ΔP'/2", which is a half of the remainder ΔP', to or from a value obtained by subtracting the first reception power PM from reception power P(a2) of the closest reception rank a2 as a transmission power adjustment amount ΔPT for the first reception power PM=P1. Next, the terminal 10 calculates, from the transmission power adjustment amount ΔPT for the first reception power PM=P1 and the reception power difference ΔP, a transmission power adjustment amount for second reception power P2, which is reception power having a smaller value between the reception power P1 of the first signal and the reception power P2 of the second signal, and adjusts transmission power by using these transmission power adjustment amounts. In this way, a sufficient reception power difference can be ensured in each base station.

As illustrated in FIGS. 10 and 13, when ΔP is equal to or larger than X and equal to or smaller than 2X, the terminal 10 according to the embodiment specifies, from the at least two ranks, a reception rank a2 closest to PM, which is a larger value between P1 and P2. Further, the terminal 10 calculates a transmission power adjustment amount ΔPT for P1 and P2 such that first reception power PM=P1 falls within the allowable variation range of the closest rank a2 and second reception power P2 falls within the allowable variation range xh of a rank a3, which is lower than the rank a2 closest to P1. In this way, a sufficient power difference can be ensured in each base station.

As illustrated in FIGS. 11 and 13, when the remainder ΔP' is larger than the total value X, the terminal 10 according to the embodiment specifies a rank a2 closest to PM=P1 from the reception ranks a1 to a4. Further, the terminal 10 calculates a value obtained by adding or subtracting half a value obtained by subtracting the remainder ΔP' from 2X, which is obtained by doubling the total value X, to or from a value obtained by subtracting PM from reception power P(a2) of the reception rank a2, as a transmission power adjustment amount ΔPT for PM=P1. Next, the terminal 10 calculates a transmission power adjustment amount for P2 from ΔPT and ΔP, or the like. In this way, a sufficient power difference can be ensured in each base station.

As illustrated in FIGS. 14 to 19, based on information indicating a sum Yd of the number of terminals AM connected to the distributed base station DB1 (first base station) and the number of terminals BM connected to the distributed base station DB2 (second base station) for each of the at least two ranks (rank order d=1 to 5), the terminal 10 according to the embodiment specifies a sum Y1(=AM+BM+s) of first ranks (rank order 1), which is a sum Yd of the numbers of connected terminals in ranks aM and aM+2, to which the reception power of the first signal and the reception power of the second signal belong. Further, when ranks (AM,BM+2), to which the reception power of the first signal and the reception power of the second signal belong, are lowered to a predetermined rank (rank order D), which is lower by one rank or two or more ranks, the terminal 10 calculates sums Y2 to YD of second ranks, each of which is a sum of the number of terminals connected to the first base station and the number of terminals connected to the second base station, for respective lower ranks (rank order 2 to D) up to the predetermined rank D. Further, when the sum Y1 of the first ranks exceeds an average value Yave of the sum Y1 of the first ranks and the sums Y2 to YD of the second ranks in the respective lower ranks, the terminal 10 determines that the ranks to which the reception power of the first signal and the reception power of the second signal belong are shifted to a lower rank (rank order 3 to 5 in FIG. 17) in which the sum Yd of the second ranks is smaller than the average value Yave, based on a first probability Po. Next, the terminal 10 reduces transmission power of the first signal and the second signal in accordance with the shift to the lower rank (S108 in FIG. 13).

In this way, when the sum Y1 of the numbers of connected terminals that transmit signals in the same ranks as the ranks of the first signal and the second signal transmitted by the terminal 10 is larger than the average value Yave, the ranks are shifted to a lower rank in which the sum Yd of the numbers of connected terminals is smaller than the average value Yave, based on the first probability Po. As a result, it is possible to reduce the possibility (probability) that the first signal and the second signal collide with (cannot ensure a sufficient power difference from) a signal from another terminal (connected terminal).

The terminal 10 according to the embodiment calculates the first probability Po by dividing a value obtained by subtracting the average value Yave from the sum Y1 of the first ranks by the sum Y1 of the first ranks (FIG. 16). In this way, the reception power of the terminal 10 can be shifted to the lower rank at a suitable probability, and the number of connected terminals can be reduced so as to reduce the possibility of collision.

When there are at least two lower ranks in which the sum Yd of the second ranks is smaller than the average value Yave as illustrated in FIG. 16, the terminal 10 according to the embodiment calculates an absolute value Zsum of a value (Δy3+Δy4+Δy5) obtained by adding values −Δyd obtained by subtracting the average value Yave from the sum Yd (Y3,Y4,Y5) of the second ranks in each of the at least two lower ranks (rank order d=3, 4, 5). Next, the terminal 10 calculates a value obtained by dividing Zsum by −Δyd for each of the at least two ranks (d=3, 4, 5) as a second probability that each of the lower ranks is selected as a shift destination at the time of shifting. In this way, it is possible to appropriately distribute shift destinations of terminals.

Other Embodiments

The embodiment described above is merely an example, and the present disclosure can be appropriately modified and implemented without departing from the scope of the present disclosure.

The processing and means described in the present disclosure can be freely combined and implemented as long as there is no technical contradiction.

Further, the processing described as being performed by one apparatus may be shared and executed by a plurality of apparatuses. Alternatively, the processing described as being performed by different apparatuses may be performed by one apparatus. In a computer system, it is possible to flexibly change the hardware configuration (server configuration) that realizes each function.

The present disclosure can also be realized by supplying a computer program having the functions described in the above embodiment to a computer and causing at least one processor included in the computer to read and execute the program. Such a computer program may be provided to a computer by a non-transitory computer-readable storage medium connectable to a system bus of the computer or may be provided to the computer via a network. Non-transitory computer-readable storage media include, for example, any type of disk, such as magnetic disks (floppy (registered trademark) disks, hard disk drives (HDDs), etc.), optical disks (CD-ROMs, DVD disks, Blu-ray disks, etc.), read-only memory (ROM), random access memory (RAM), EPROM, EEPROM, magnetic cards, flash memory, optical cards, any type of media suitable for storing electronic instructions.

What is claimed is:

1. A transmission power control method for a terminal capable of transmitting a first signal received by a first base station and a second signal received by a second base station by power-domain non-orthogonal multiple access, the transmission power control method comprising:
    calculating, by a terminal, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin; and
    adjusting, by the terminal, transmission power of the first signal and the second signal in the terminal by using the transmission power adjustment amount.

2. The transmission power control method according to claim 1, wherein a size of the allowable variation range and a size of the margin are identical to each other and an interval between the at least two ranks is defined to a value obtained by doubling a total value of the size of the allowable variation range and the size of the margin.

3. The transmission power control method according to claim 1,
    wherein, when the reception power difference between the first signal and the second signal is smaller than the allowable variation range, the terminal specifies, from the at least two ranks, a rank closest to first reception power, which is reception power having a larger value between the reception power of the first signal and the reception power of the second signal, and
    wherein the terminal calculates the transmission power adjustment amount such that the reception power of the first signal and the reception power of the second signal fall within the allowable variation range of the closest rank.

4. The transmission power control method according to claim 1,
    wherein, when a remainder obtained by dividing the reception power difference between the first signal and the second signal by a value obtained by doubling a total value of the size of the allowable variation range and the size of the margin is smaller than the total value, the terminal specifies, from the at least two ranks, a rank closest to first reception power, which is reception power having a larger value between the reception power of the first signal and the reception power of the second signal,
    wherein the terminal calculates a value obtained by adding or subtracting a half of the remainder to or from a value obtained by subtracting the first reception power from reception power of the closest rank, as a transmission power adjustment amount for the first reception power, and
    wherein the terminal calculates, from the transmission power adjustment amount for the first reception power and the reception power difference, a transmission power adjustment amount for second reception power, which is reception power having a smaller value between the reception power of the first signal and the reception power of the second signal.

5. The transmission power control method according to claim 1,
wherein, when the reception power difference between the first signal and the second signal is equal to or larger than the allowable variation range and equal to or smaller than a value obtained by doubling a total value of the size of the allowable variation range and the size of the margin, the terminal specifies, from the at least two ranks, a rank closest to first reception power, which is reception power having a larger value between the reception power of the first signal and the reception power of the second signal, and
wherein the terminal calculates a transmission power adjustment amount for the first reception power and second reception power such that the first reception power falls within the allowable variation range of the closest rank and the second reception power, which is the reception power having a smaller value between the reception power of the first signal and the reception power of the second signal, falls within the allowable variation range of a rank lower than the closest rank.

6. The transmission power control method according to claim 1,
wherein, when a remainder obtained by dividing the reception power difference between the first signal and the second signal by a value obtained by doubling a total value of the size of the allowable variation range and the size of the margin is larger than the total value, the terminal specifies, from the at least two ranks, a rank closest to first reception power, which is reception power having a larger value between the reception power of the first signal and the reception power of the second signal,
wherein the terminal calculates a value obtained by adding or subtracting half a value obtained by subtracting the remainder from a value obtained by doubling the total value to or from a value obtained by subtracting the first reception power from reception power of the closest rank, as a transmission power adjustment amount for the first reception power, and
wherein the terminal calculates, from the transmission power adjustment amount for the first reception power and the reception power difference, a transmission power adjustment amount for second reception power, which is reception power having a smaller value between the reception power of the first signal and the reception power of the second signal.

7. The transmission power control method according to claim 1,
wherein, based on information indicating a sum of the number of terminals connected to the first base station and the number of terminals connected to the second base station for each of the at least two ranks, the terminal specifies a sum of first ranks, which is a sum of the numbers of connected terminals in ranks to which the reception power of the first signal and the reception power of the second signal belong,
wherein, when ranks to which the reception power of the first signal and the reception power of the second signal belong are lowered to a predetermined rank, which is lower by one rank or two or more ranks, the terminal calculates sums of second ranks, each of which is a sum of the number of terminals connected to the first base station and the number of terminals connected to the second base station, for respective lower ranks up to the predetermined rank,
wherein, when the sum of the first ranks exceeds an average value of the sum of the first ranks and the sums of the second ranks in the respective lower ranks, the terminal determines that the ranks to which the reception power of the first signal and the reception power of the second signal belong are shifted to a lower rank in which the sum of the second ranks is smaller than the average value, based on a first probability, and
wherein the terminal reduces transmission power of the first signal and the second signal in accordance with the shift to the lower ranks.

8. The transmission power control method according to claim 7, wherein the terminal calculates the first probability by dividing a value, obtained by subtracting the average value from the sum of the first ranks, by the sum of the first ranks.

9. The transmission power control method according to claim 7,
wherein, when there are at least two lower ranks in which the sum of the second ranks is smaller than the average value, the terminal calculates an absolute value of a value obtained by adding values obtained by subtracting the average value from the sum of the second ranks in each of the at least two lower ranks, and
wherein the terminal calculates, for each of the at least two lower ranks, a value obtained by dividing the absolute value by a value obtained by subtracting the average value from the sum of the second ranks as a probability at which each of the at least two lower ranks is selected as a shift destination.

10. A terminal capable of transmitting a first signal received by a first base station and a second signal received by a second base station by power-domain non-orthogonal multiple access, the terminal comprising:
a controller that calculates, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin, and adjusts transmission power of the first signal and the second signal in the terminal by using the transmission power adjustment amount.

11. The terminal according to claim 10, wherein the terminal defines that a size of the allowable variation range and a size of the margin are identical and that an interval between the at least two ranks is set to a value obtained by doubling a total value of the size of the allowable variation range and the size of the margin.

12. The terminal according to claim 10,
wherein, when the reception power difference between the first signal and the second signal is smaller than the allowable variation range, the controller specifies, from the at least two ranks, a rank closest to first reception power, which is reception power having a larger value between the reception power of the first signal and the reception power of the second signal, and
wherein the controller calculates the transmission power adjustment amount such that the reception power of the first signal and the reception power of the second signal fall within the allowable variation range of the closest rank.

13. The terminal according to claim 10,
wherein, when a remainder obtained by dividing the reception power difference between the first signal and the second signal by a value obtained by doubling a total value of the size of the allowable variation range and the size of the margin is smaller than the total value, the controller specifies, from the at least two ranks, a rank closest to first reception power, which is reception power having a larger value between the reception power of the first signal and the reception power of the second signal,
wherein the controller calculates a value obtained by adding or subtracting a half of the remainder to or from a value obtained by subtracting the first reception power from reception power of the closest rank, as a transmission power adjustment amount for the first reception power,
wherein the controller calculates, from the transmission power adjustment amount for the first reception power and the reception power difference, a transmission power adjustment amount for second reception power, which is reception power having a smaller value between the reception power of the first signal and the reception power of the second signal.

14. The terminal according to claim 10,
wherein, when the reception power difference between the first signal and the second signal is equal to or larger than the allowable variation range and equal to or smaller than a value obtained by doubling a total value of the size of the allowable variation range and the size of the margin, the controller specifies, from the at least two ranks, a rank closest to first reception power, which is the reception power having a larger value between the reception power of the first signal and the reception power of the second signal, and
wherein the controller calculates a transmission power adjustment amount for the first reception power and second reception power such that the first reception power falls within the allowable variation range of the closest rank and the second reception power, which is the reception power having a smaller value between the reception power of the first signal and the reception power of the second signal, falls within the allowable variation range of a rank lower than the closest rank.

15. The terminal according to claim 10,
wherein, when a remainder obtained by dividing the reception power difference between the first signal and the second signal by a value obtained by doubling a total value of the size of the allowable variation range and the size of the margin is larger than the total value, the controller specifies, from the at least two ranks, a rank closest to first reception power, which is reception power having a larger value between the reception power of the first signal and the reception power of the second signal,
wherein the controller calculates a value obtained by adding or subtracting half a value obtained by subtracting the remainder from a value obtained by doubling the total value to or from a value obtained by subtracting the first reception power from reception power of the closest rank, as a transmission power adjustment amount for the first reception power, and
wherein the controller calculates, from the transmission power adjustment amount for the first reception power and the reception power difference, a transmission power adjustment amount for second reception power, which is reception power having a smaller value between the reception power of the first signal and the reception power of the second signal.

16. The terminal according to claim 10,
wherein, based on information indicating a sum of the number of terminals connected to the first base station and the number of terminals connected to the second base station for each of the at least two ranks, the controller specifies a sum of first ranks, which is a sum of the numbers of connected terminals in ranks to which the reception power of the first signal and the reception power of the second signal belong,
wherein, when ranks to which the reception power of the first signal and the reception power of the second signal belong are lowered to a predetermined rank, which is lower by one rank or two or more ranks, the controller calculates sums of second ranks, each of which is a sum of the number of terminals connected to the first base station and the number of terminals connected to the second base station, for respective lower ranks up to the predetermined rank,
wherein, when the sum of the first ranks exceeds an average value of the sum of the first ranks and the sums of the second ranks in the respective lower ranks, the controller determines that the ranks to which the reception power of the first signal and the reception power of the second signal belong are shifted to a lower rank in which the sum of the second ranks is smaller than the average value, based on a first probability, and
wherein the controller reduces transmission power of the first signal and the second signal in accordance with the shift to the lower ranks.

17. The terminal according to claim 16, wherein the controller calculates the first probability by dividing a value obtained by subtracting the average value from the sum of the first ranks by the sum of the first ranks.

18. The terminal according to claim 16,
wherein, when there are at least two of the lower ranks in each of which the sum of the second ranks is smaller than the average value, the controller calculates an absolute value of a value obtained by adding values obtained by subtracting the average value from the sum of the second ranks in each of the at least two lower ranks, and
wherein the controller calculates, for each of the at least two lower ranks, a value obtained by dividing the absolute value by a value obtained by subtracting the average value from the sum of the second ranks as a probability at which each of the at least two lower ranks is selected as a shift destination.

19. A wireless communication system comprising:

a first base station;

a second base station; and a terminal capable of transmitting a first signal received by the first base station and a second signal received by the second base station by power-domain non-orthogonal multiple access, wherein the terminal includes a controller that calculates, in a case where reception power is divided into at least two ranks at equal intervals, each of the at least two ranks has an allowable variation range having an identical size, a margin is set between a lower limit of the allowable variation range in an upper rank and an upper limit of the allowable variation range in a lower rank, the upper rank and the lower rank being adjacent to each other in the at least two ranks, and where a size of the allowable variation range is equal to or larger than a size of the margin, a transmission power adjustment amount for the first signal and the second signal such that reception power of the first signal and reception power of the second signal fall within the allowable variation range of any of the at least two ranks by using the reception power of the first signal, the reception power of the second signal, a reception power difference between the first signal and the second signal, the at least two ranks, the allowable variation range, and the margin, and adjusts the transmission power of the first signal and the second signal in the terminal by using the transmission power adjustment amount.

20. The wireless communication system according to claim 19, wherein, based on information indicating a sum of the number of terminals connected to the first base station and the number of terminals connected to the second base station for each of the at least two ranks, the controller specifies a sum of first ranks, which is a sum of the numbers of connected terminals in ranks to which the reception power of the first signal and the reception power of the second signal belong, wherein, when ranks to which the reception power of the first signal and the reception power of the second signal belong are lowered to predetermined rank, which is lower by one rank or two or more ranks, the controller calculates sums of second ranks, each of which is a sum of the number of terminals connected to the first base station and the number of terminals connected to the second base station, for respective lower ranks up to the predetermined rank, wherein, when the sum of the first ranks exceeds an average value of the sum of the first ranks and the sums of the second ranks in the respective lower ranks, the controller determines that the ranks to which the reception power of the first signal and the reception power of the second signal belong are shifted to a lower rank in which the sum of the second ranks is smaller than the average value, based on a first probability, and wherein the controller reduces transmission power of the first signal and the second signal in accordance with the shift to the lower rank.

\* \* \* \* \*